United States Patent
Wang et al.

(10) Patent No.: US 10,931,930 B2
(45) Date of Patent: Feb. 23, 2021

(54) METHODS AND APPARATUS FOR IMMERSIVE MEDIA CONTENT OVERLAYS

(71) Applicant: MEDIATEK Singapore Pte. Ltd., Singapore (SG)

(72) Inventors: Xin Wang, San Jose, CA (US); Lulin Chen, San Jose, CA (US)

(73) Assignee: MEDIATEK Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/502,560

(22) Filed: Jul. 3, 2019

(65) Prior Publication Data

US 2020/0014906 A1    Jan. 9, 2020

Related U.S. Application Data

(60) Provisional application No. 62/697,569, filed on Jul. 13, 2018, provisional application No. 62/694,538, filed on Jul. 6, 2018, provisional application No. 62/694,542, filed on Jul. 6, 2018.

(51) Int. Cl.
| | |
|---|---|
| H04N 13/178 | (2018.01) |
| H04N 19/46 | (2014.01) |
| H04N 5/45 | (2011.01) |
| H04N 5/272 | (2006.01) |
| H04N 19/44 | (2014.01) |

(52) U.S. Cl.
CPC .......... *H04N 13/178* (2018.05); *H04N 5/272* (2013.01); *H04N 5/45* (2013.01); *H04N 19/44* (2014.11); *H04N 19/46* (2014.11)

(58) Field of Classification Search
None
See application file for complete search history.

(56) References Cited

U.S. PATENT DOCUMENTS

| | | | |
|---|---|---|---|
| 9,241,167 B2 * | 1/2016 | Wu | H04N 19/174 |
| 9,602,891 B2 * | 3/2017 | Winograd | H04N 21/4622 |
| 10,045,065 B2 * | 8/2018 | Subramaniam | H04N 21/8153 |
| 10,277,959 B2 * | 4/2019 | Winograd | H04N 21/4622 |
| 10,297,086 B2 * | 5/2019 | Wallner | G06T 17/20 |
| 2013/0094590 A1 * | 4/2013 | Laksono | G06F 16/7867 |
| | | | 375/240.25 |

(Continued)

FOREIGN PATENT DOCUMENTS

WO   WO-2019231235 A1 * 12/2019 ............... G06T 5/00

OTHER PUBLICATIONS

International Search Report and Written Opinion dated Sep. 30, 2019 in connection with International Application No. PCT/US2019/040676.

(Continued)

*Primary Examiner* — Reza Aghevli
(74) *Attorney, Agent, or Firm* — Wolf, Greenfield & Sacks, P.C.

(57) ABSTRACT

The techniques described herein relate to methods, apparatus, and computer readable media configured to decode video data. Video data includes video content, overlay content, and overlay metadata that is specified separate from the video content and overlay content. The overlay content is determined to be associated with the video content based on the overlay metadata. The overlay content is overlaid onto the video content in the region of the video content.

12 Claims, 23 Drawing Sheets

(56) References Cited

U.S. PATENT DOCUMENTS

| | | | | |
|---|---|---|---|---|
| 2013/0170813 | A1* | 7/2013 | Woods | H04N 5/765 386/200 |
| 2013/0215978 | A1* | 8/2013 | Wu | H04N 19/12 375/240.26 |
| 2013/0311595 | A1* | 11/2013 | Milatinovici | H04N 21/4307 709/214 |
| 2016/0073155 | A1* | 3/2016 | Subramaniam | H04N 21/4316 725/32 |
| 2016/0182973 | A1* | 6/2016 | Winograd | H04N 21/8586 725/25 |
| 2017/0251282 | A1* | 8/2017 | Winograd | H04N 21/262 |
| 2018/0005449 | A1* | 1/2018 | Wallner | G06T 19/006 |
| 2018/0061002 | A1* | 3/2018 | Lee | H04N 19/597 |
| 2018/0322679 | A1* | 11/2018 | Kunkel | G06K 9/4652 |
| 2019/0306519 | A1* | 10/2019 | Chen | H04N 19/187 |
| 2019/0379856 | A1* | 12/2019 | Hur | H04N 5/23238 |
| 2019/0379876 | A1* | 12/2019 | Hur | H04N 21/4728 |
| 2019/0379884 | A1* | 12/2019 | Oh | H04N 19/46 |
| 2020/0014905 | A1* | 1/2020 | Oh | H04N 21/26258 |
| 2020/0014906 | A1* | 1/2020 | Wang | G06K 9/00 |
| 2020/0014907 | A1* | 1/2020 | Lee | H04N 21/26258 |

OTHER PUBLICATIONS

[No Author Listed], Information technology—Coded representation of immersive media (MPEG-I)—Part 2: Omnidirectional media format. ISO/IEC FDIS 23090-12:201x (E). Dec. 11, 2017:178 pages.

[No Author Listed], Information technology—Coded representation of immersive media (MPEG-I)—Part 2: Omnidirectional media format. ISO/IEC FDIS 23090-2:201x (E). Apr. 26, 2018:179 pages.

[No Author Listed], Information technology—Coding of audiovisual objects, Part 12: ISO base media file format. International Standard, ISO/IEC 14496-12, Fifth Edition. Feb. 20, 2015:250 pages.

[No Author Listed], Information technology—Coding of audiovisual objects—Part 15: Carriage of network abstraction layer (NAL) unit structured video in the ISO base media file format. ISO/IEC FDIS 14496-15:2014(E). Jan. 13, 2014:172 pages.

[No Author Listed], Information technology—Dynamic adaptive streaming over HTTP (DASH)—Part 1: Media presentation description and segment formats, 3rd Edition. ISO/IEC 23009-1:2016(E). Jan. 9, 2017:218 pages.

Champel et al., Proposed Draft 1.0 of TR: Technical Report on Architectures for Immersive Media. International Organisation for Standardisation, Coding of Moving Pictures and Audio, ISO/IEC JTC1/SC29/WG11 N17685. Apr. 2018:13 pages.

Koenen et al., Requirements MPRG-I phase 1b. International Organisation for Standardisation, Coding of Moving Pictures and Audio, ISO/IEC JTC1/SC29/WG11 N17331. Jan. 2018:8 pages.

Singer et al., Technologies under Consideration for ISOBMFF. International Organisation for Standardisation, Coding of Moving Pictures and Audio, ISO/IEC JTC1/SC29/WG11 MPEG2018/N17575. Apr. 2018:39 pages.

Wang et al., [OMAF] Editor's Input Text for OMAF WD Based on Finland AHG Agreements. International Organisation for Standardisation, Coding of Moving Pictures and Audio, ISO/IEC JTC1/SC29/WG11 M42923-v1. Jul. 2018:199 pages.

Wang et al., Deriving Composite Tracks in ISOBMFF using Track Grouping Mechanisms. Organisation for Standardisation, Coding of Moving Pictures and Audio, ISO/IEC JTC1/SC29/WG11 MPEG2016/M40384. Apr. 2017:12 pages.

Wang et al., Deriving Composite Tracks in ISOBMFF. International Organisation for Standardisation, Coding of Moving Pictures and Audio, ISO/IEC JTC1/SC29/WG11 MPEG2016/M39971. Jan. 2017:9 pages.

Wang et al., Deriving VR Projection and Mapping related Tracks in ISOBMFF. International Organisation for Standardisation, Coding of Moving Pictures and Audio, ISO/IEC JTC1/SC29/WG11 MPEG2016/M40385. Apr. 2017:8 pages.

Wang et al., Deriving VR ROI and Viewport related Tracks in ISOBMFF. International Organisation for Standardisation, Coding of Moving Pictures and Audio, ISO/IEC JTC1/SC29/WG11 MPEG2016/M40412. Apr. 2017:11 pages.

Wang et al., Overlay Track Derivation. International Organisation for Standardisation, Coding of Moving Pictures and Audio, ISO/IEC JTC1/SC29/WG11 MPEG2018/m43424. Jul. 2018:4 pages.

Wang et al., Signaling of Multiple Viewpoints in OMAF for Support of Zooming. International Organisation for Standardisation, Coding of Moving Pictures and Audio, ISO/IEC JTC1/SC29/WG11 MPEG2018/m42909. Jul. 2018:3 pages.

Wang et al., Signaling of Overlays for Omnidirectional Video and Images using Timed Metadata Tracks in ISOBMFF. International Organisation for Standardisation, Coding of Moving Pictures and Audio, ISO/IEC JTC1/SC29/WG11 MPEG2018/m42908. Jul. 2018:5 pages.

Yip et al., Draft Requirements for MPEG-I Phase 2. International Organisation for Standardisation, Coding of Moving Pictures and Audio, ISO/IEC JTC1/SC29/WG11 MPEG2018/N17513. Apr. 2018:6 pages.

Yip, MPEG-I Phase 2 Use Cases. International Organisation for Standardisation, Coding of Moving Pictures and Audio, ISO/IEC JTC1/SC29/WG11 N17683. Apr. 2018:10 pages.

* cited by examiner

```
aligned(8) class SingleOverlayStruct() {
    unsigned int(16) overlay_id;
    for (i = 0; i < num_flag_bytes * 8; i++)
        unsigned int(1) overlay_control_flag[i];

for (i = 0; i < num_flag_bytes * 8; i++){
        if (overlay_control_flag[i]) {
            unsigned int(1) overlay_control_essential_flag[i];
            unsigned int(15) byte_count[i];
            unsigned int(8) overlay_control_struct[i][byte_count[i]];
        }
    }
}
```

400

```
aligned(8) class OverlayStruct() {
    unsigned int(16) num_overlays;
    unsigned int(8) num_flag_bytes;
    for (i = 0; i < num_overlays; i++)
        SingleOverlayStruct();
}
```

```
class OverlaySampleEntry (type) extends MetadataSampleEntry('ovly') {
    for (i = 0; i < num_references; i++)
        OverlayStruct();                        ← 704
    bit(7) reserved = 0;                        ← 702
    unsigned int(1) time-variant_overlay_flag;  ← 706
}
```

700

```
class OverlaySample {
    if (time-variant_overlay_flag == 1) {
        unsigned int(16) num_active_overlays_by_id;   ← 752
        for (i = 0; i < num_active_overlays_by_id; i++)  ← 756
            unsigned int(16) active_overlay_id;        ← 754
    }
}
```

```
aligned(8) class TrackOverlayComposition
extends TransformProperty ('ovly') {
    unsigned int(8) num_flag_bytes;    ← 902
    for (i = 0; i < num_inputs; i++)
        SingleOverlayStruct();          ← 904
}
```

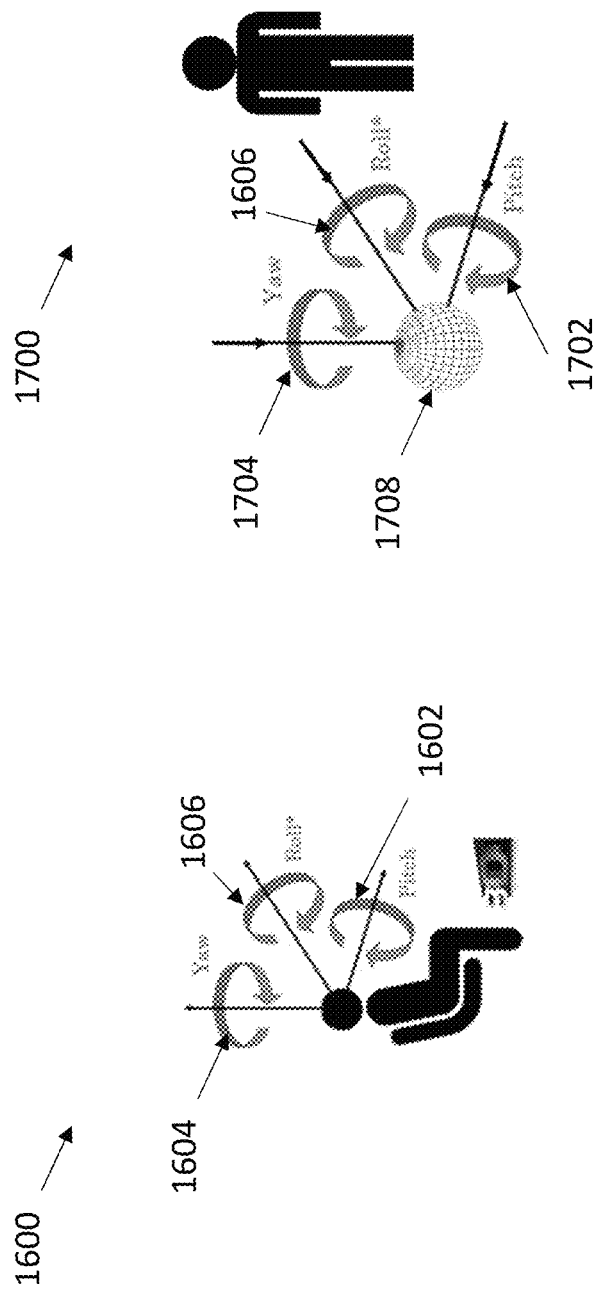

METHODS AND APPARATUS FOR IMMERSIVE MEDIA CONTENT OVERLAYS

RELATED APPLICATIONS

This Application claims priority under 35 U.S.C. § 119(e) to U.S. Provisional Application Ser. No. 62/694,538, filed Jul. 6, 2018, entitled "METHOD OF SIGNALING IMMERSIVE MEDIA CONTENT OVERLAYS USING TIMED METADATA TRACKS IN ISOBMFF," U.S. Provisional Application Ser. No. 62/694,542, filed Jul. 6, 2018, entitled "METHOD OF SIGNALING IMMERSIVE MEDIA CONTENT OVERLAYS USING DERIVED OVERLAY TRACKS AND IN DASH," and U.S. Provisional Application Ser. No. 62/697,569, filed Jul. 13, 2018, and entitled "SYSTEM AND METHOD OF SIGNALING AND PROCESSING REVERSED 3DOF MEDIA CONTENT," which are herein incorporated by reference in their entirety.

TECHNICAL FIELD

The techniques described herein relate generally to video coding, and particularly to immersive media content overlays, including signaling immersive media content overlays, such as by signaling immersive media content overlays using derived overlay tracks and/or timed metadata tracks.

BACKGROUND OF INVENTION

Various types of 3D content and multi-directional content exist. For example, omnidirectional video is a type of video that is captured using a set of cameras, as opposed to just a single camera as done with traditional unidirectional video. For example, cameras can be placed around a particular center point, so that each camera captures a portion of video on a spherical coverage of the scene to capture 360-degree video. Video from multiple cameras can be stitched, possibly rotated, and projected to generate a projected two-dimensional picture representing the spherical content. For example, an equal rectangular projection can be used to put the spherical map into a two-dimensional image. This can be then further processed, for example, using two-dimensional encoding and compression techniques. Ultimately, the encoded and compressed content is stored and delivered using a desired delivery mechanism (e.g., thumb drive, digital video disk (DVD), file download, digital broadcast, and/or online streaming). Such video can be used for virtual reality (VR) and/or 3D video.

At the client side, when the client processes the content, a video decoder decodes the encoded and compressed video and performs a reverse-projection to put the content back onto the sphere. A user can then view the rendered content, such as using a head-mounted viewing device. The content is often rendered according to a user's viewport, which represents an angle at which the user is looking at the content. The viewport may also include a component that represents the viewing area, which can describe how large, and in what shape, the area is that is being viewed by the viewer at the particular angle.

When the video processing is not done in a viewport-dependent manner, such that the video encoder and/or decoder do not know what the user will actually view, then the whole encoding, delivery and decoding process will process the entire spherical content. This can allow, for example, the user to view the content at any particular viewport and/or area, since all of the spherical content is encoded, delivered and decoded.

However, processing all of the spherical content can be compute intensive and can consume significant bandwidth. For example, for online streaming applications, processing all of the spherical content can place a larger burden on network bandwidth than necessarily needed. Therefore, it can be difficult to preserve a user's experience when bandwidth resources and/or compute resources are limited. Some techniques only process the content being viewed by the user. For example, if the user is viewing a top area (e.g., the north pole), then there is no need to deliver the bottom part of the content (e.g., the south pole). If the user changes viewports, then the content can be delivered accordingly for the new viewport. As another example, for free viewpoint TV (FTV) applications (e.g., which capture video of a scene using a plurality of cameras), the content can be delivered depending at which angle the user is viewing the scene. For example, if the user is viewing the content from one viewport (e.g., camera and/or neighboring cameras), there is probably no need to deliver content for other viewports.

SUMMARY OF INVENTION

In accordance with the disclosed subject matter, apparatus, systems, and methods are provided for immersive media content overlays.

Some embodiments relate to a decoding method for decoding video data. The method includes receiving video data including video content, overlay content, and overlay metadata that is specified separate from the video content and overlay content, wherein the overlay metadata specifies a region of the video content. The method includes determining the overlay content is associated with the video content based on the overlay metadata. The method includes overlaying the overlay content onto the video content in the region of the video content.

In some examples, receiving the video data includes receiving a timed metadata track comprising the overlay metadata.

In some examples, the overlay content includes first overlay content and second overlay content that is different than the first overlay content, and the method includes determining, based on the overlay metadata, first overlay content is associated with a first time period and second overlay content is associated with a second time period after the first time period, overlaying the first overlay content on the video content in the region during the first time period, and overlaying the second overlay content on the video content in the region during the second time period.

In some examples, the overlay content includes first overlay content and second overlay content that is different than the first overlay content, and the overlay metadata does not specify whether to overlay the first overlay content or the second overlay content, such that whether to use the first overlay content or the second overlay content is determined dynamically.

In some examples, the overlay content includes first overlay content and second overlay content that is different than the first overlay content. The overlay metadata includes a first timed metadata track specifying overlay metadata for the first overlay content, and a second timed metadata track specifying overlay metadata for the second overlay content. The method further includes selecting one of the first timed metadata track or the second timed metadata track to overlay either the first overlay content or the second overlay content, respectively.

In some examples, the overlay metadata is specified in an overlay derived track, and overlaying the overlay content on the video content in the region includes generating sample content, according to the overlay metadata, for the derived track with the video content and the overlay content.

Some embodiments relate to a decoding method for decoding streaming data. The method includes receiving media presentation data, the media presentation data including first data indicative of video content, second data indicative of overlay content, and third data indicative of overlay metadata specifying how the overlay content should be overlaid onto the video content. The method includes determining the overlay content is associated with the video content based on the media presentation data, downloading (a) the video content based on the first data and (b) the overlay content based on the second data, and overlaying the overlay content on the video content in a region of the video content based on the overlay metadata.

In some examples, the second data includes the third data comprising an identifier of the overlay content.

In some examples, the third data indicative of overlay metadata is time-based, and the media presentation data further includes fourth data indicative of second overlay content. The method further includes determining, based on the time-based overlay metadata in the third data, that the overlay content is associated with a first time period and the second overlay content is associated with a second time period after the first time period, downloading the second overlay content based on the fourth data, overlaying the first overlay content on the video content in the region during the first time period, and overlaying the second overlay content on the video content in the region during the second time period.

In some examples, the third data indicative of overlay metadata is dynamic, the media presentation data further comprises fourth data indicative of second overlay content, and the third data does not specify whether to overlay the overlay content or the second overlay content, such that whether to use the first overlay content or the second overlay content is determined dynamically.

In some examples, the third data indicative of overlay metadata is first static overlay metadata for the overlay content, the media presentation data further includes fourth data indicative of second overlay content and fifth data indicative of second static overlay metadata for the second overlay content, and the method further includes selecting the first content to overlay on the video content.

Some embodiments relate to an apparatus configured to decode video data. The apparatus includes a processor in communication with memory, the processor being configured to execute instructions stored in the memory that cause the processor to receive video data including video content, overlay content, and overlay metadata that is specified separate from the video content and overlay content, wherein the overlay metadata specifies a region of the video content. The instructions are configured to cause the processor to determine the overlay content is associated with the video content based on the overlay metadata, and overlay the overlay content onto the video content in the region of the video content.

In some examples, receiving the video data includes receiving a timed metadata track comprising the overlay metadata.

In some examples, the overlay content includes first overlay content and second overlay content that is different than the first overlay content, and the instructions further cause the processor to determine, based on the overlay metadata, first overlay content is associated with a first time period and second overlay content is associated with a second time period after the first time period, overlay the first overlay content on the video content in the region during the first time period, and overlay the second overlay content on the video content in the region during the second time period.

In some examples, the overlay content includes first overlay content and second overlay content that is different than the first overlay content, and the overlay metadata does not specify whether to overlay the first overlay content or the second overlay content, such that whether to use the first overlay content or the second overlay content is determined dynamically.

In some examples, the overlay content includes first overlay content and second overlay content that is different than the first overlay content, and the overlay metadata includes a first timed metadata track specifying overlay metadata for the first overlay content and a second timed metadata track specifying overlay metadata for the second overlay content. The instructions are further configured to cause the processor to select one of the first timed metadata track or the second timed metadata track to overlay either the first overlay content or the second overlay content, respectively.

In some examples, the overlay metadata is specified in an overlay derived track, and overlaying the overlay content on the video content in the region comprises generating sample content, according to the overlay metadata, for the derived track with the video content and the overlay content.

Some embodiments relate to an apparatus configured to decode video data. The apparatus includes a processor in communication with memory, the processor being configured to execute instructions stored in the memory that cause the processor to receive media presentation data, the media presentation data comprising first data indicative of video content, second data indicative of overlay content, and third data indicative of overlay metadata specifying how the overlay content should be overlaid onto the video content. The instructions cause the processor to determine the overlay content is associated with the video content based on the media presentation data, download (a) the video content based on the first data and (b) the overlay content based on the second data, and overlay the overlay content on the video content in a region of the video content based on the overlay metadata.

In some examples, the second data comprises the third data comprising an identifier of the overlay content.

In some examples, the third data indicative of overlay metadata is time-based and the media presentation data further comprises fourth data indicative of second overlay content, and the instructions further configured to cause the processor to determine, based on the time-based overlay metadata in the third data, that the overlay content is associated with a first time period and the second overlay content is associated with a second time period after the first time period, download the second overlay content based on the fourth data, overlay the first overlay content on the video content in the region during the first time period, and overlay the second overlay content on the video content in the region during the second time period.

In some examples, the third data indicative of overlay metadata is dynamic, the media presentation data further comprises fourth data indicative of second overlay content, and the third data does not specify whether to overlay the overlay content or the second overlay content, such that whether to use the first overlay content or the second overlay content is determined dynamically.

In some examples, the third data indicative of overlay metadata is first static overlay metadata for the overlay content, and the media presentation data further includes fourth data indicative of second overlay content, fifth data indicative of second static overlay metadata for the second overlay content, and the instructions further cause the processor to select the first content to overlay on the video content.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 4 shows exemplary syntaxes for overlay structures, according to some examples.

FIG. 7 shows an exemplary syntax for an overlay sample entry, according to some embodiments.

FIG. 9 shows an exemplary syntax for an overlay transform property, according to some embodiments.

FIG. 16 is a diagram showing the 3DoF rotational movements, according to some examples.

FIG. 17 is a diagram showing the reversed 3DoF rotational movements, according to some embodiments.

DETAILED DESCRIPTION OF INVENTION

Figure 1:
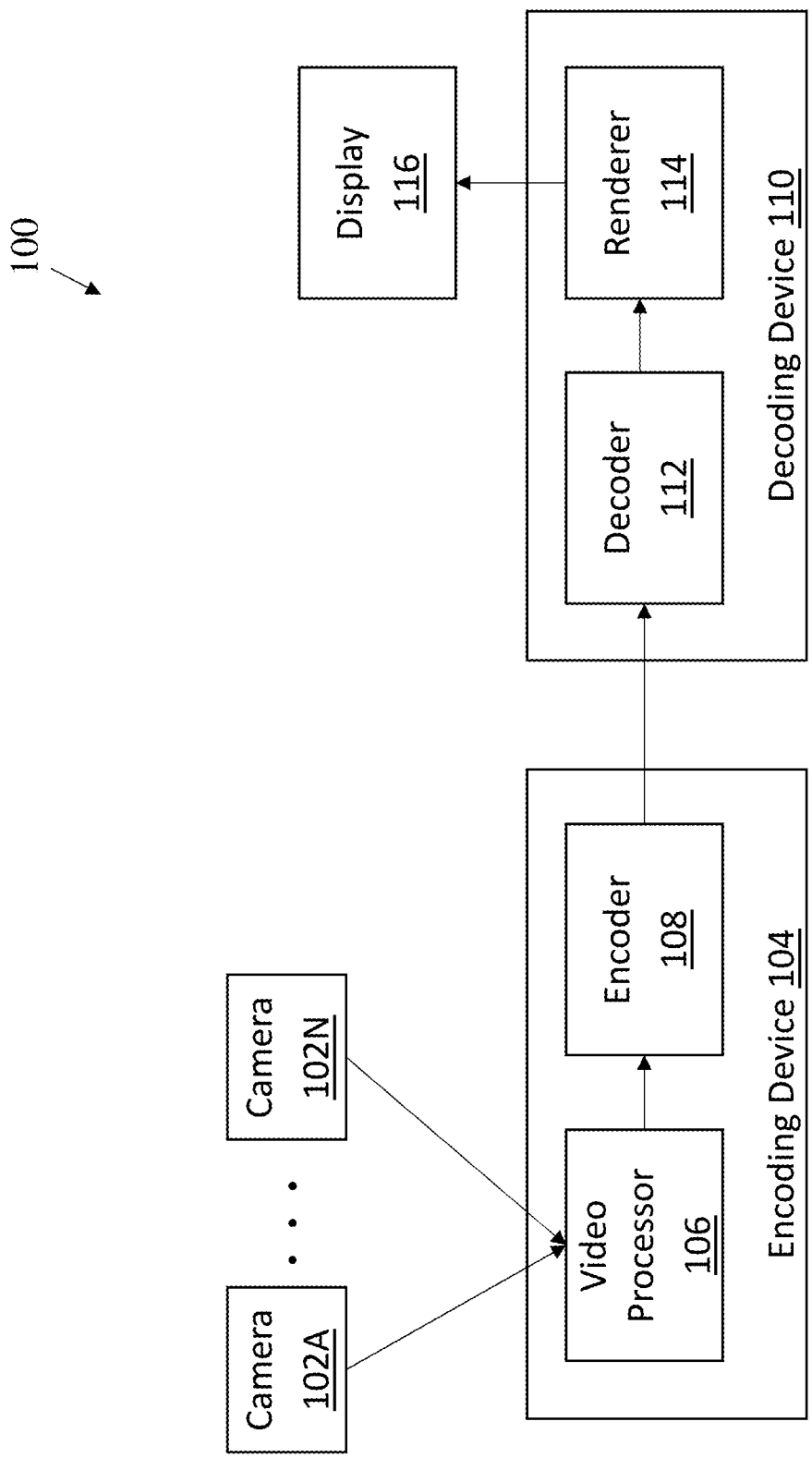
FIG. 1 shows an exemplary video coding configuration, according to some embodiments.

Various techniques can be used to perform overlays, including in composite tracks of file formats (e.g., ISO Base Media File Format (ISOBMFF)) as well as in streaming formats (e.g., Moving Picture Experts Group (MPEG) Dynamic Adaptive Streaming over HTTP (DASH)). For applications with immersive media content or huge frame size content, there may be multiple source devices and/or multiple sync/rendering devices involved in an end-to-end system and various spatial and temporal compositions may be specified for final presentations. Therefore it is desired to specify such composition metadata aligned in time, space location, and object layer ordering.

The inventors have discovered and appreciated various deficiencies with existing overlay signaling and processing techniques. For example, overlay metadata is carried in the overlay content and/or media tracks themselves, which can result in poor storage efficiency since for n overlays over m possible backgrounds, the existing techniques can result in n*m instances of the overlay metadata. As another example, the metadata is signaled in a projected omnidirectional video box, which implies that the track is omnidirectional and therefore excludes other media types, such as two-dimensional media and/or timed text. Further, the storage of static overlay metadata within the media tracks or items is not efficient because it can be difficult, if not infeasible, to determine a specific overlay and the tracks and items involved in the overlay.

The inventors have developed techniques to signal overlay metadata separate from the video content and media content. In some embodiments, the techniques decouple overlays from projected omnidirectional video, which allows an overlay to be any piece of visual media (e.g., video, an image item or timed text) rendered over omnidirectional video, over an image item, and/or over a viewport. The techniques also decouple overlay metadata from the video tracks and overlay content. This can allow, for example, overlay metadata to be extended to track references in timed metadata tracks. Timed metadata tracks can be used to provide static, time-variant, and/or time variant overlays. Additionally, or alternatively, overlays can be performed using overlay track derivation.

As discussed herein, file and streaming format types include ISOBMFF and MPEG DASH. When VR content is delivered using MPEG DASH, many overlay use cases often require signaling overlay information. However, existing streaming formats including DASH do not support signaling overlay information. In some embodiments according to the techniques described herein, DASH media presentation data, including representations, can be used to signal overlays. In some embodiments, static overlays can be signaled using an overlay descriptor, by using multiple representations for timed metadata tracks (e.g., where each timed metadata track is associated with respective overlay content), and/or by using derived overlay tracks. In some embodiments, time-variant overlays can be signaled using a representation for the time-variant overlay metadata. In some embodiments, dynamic overlays can be signaled using a representation for the dynamic overlay metadata.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

FIG. 1 shows an exemplary video coding configuration 100, according to some embodiments. Cameras 102A-102N are N number of cameras, and can be any type of camera (e.g., cameras that include audio recording capabilities, and/or separate cameras and audio recording functionality). The encoding device 104 includes a video processor 106 and an encoder 108. The video processor 106 processes the video received from the cameras 102A-102N, such as stitching, projection, and/or mapping. The encoder 108 encodes and/or compresses the two-dimensional video data. The decoding device 110 receives the encoded data. The decoding device 110 may receive the video as a video product (e.g., a digital video disc, or other computer readable media), through a broadcast network, through a mobile network (e.g., a cellular network), and/or through the Internet. The decoding device 110 can be, for example, a computer, a hand-held device, a portion of a head-mounted display, or any other apparatus with decoding capability. The decoding device 110 includes a decoder 112 that is configured to decode the encoded video. The decoding device 110 also includes a renderer 114 for rendering the two-dimensional content back to a format for playback. The display 116 displays the rendered content from the renderer 114.

Generally, 3D content can be represented using spherical content to provide a 360 degree view of a scene (e.g., sometimes referred to as omnidirectional media content). While a number of views can be supported using the 3D sphere, an end user typically just views a portion of the content on the 3D sphere. The bandwidth required to transmit the entire 3D sphere can place heavy burdens on a network, and may not be sufficient to support spherical content. It is therefore desirable to make 3D content delivery more efficient. Viewport dependent processing can be performed to improve 3D content delivery. The 3D spherical content can be divided into regions/tiles/sub-pictures, and only those related to viewing screen (e.g., viewport) can be transmitted and delivered to the end user.

Figure 2:
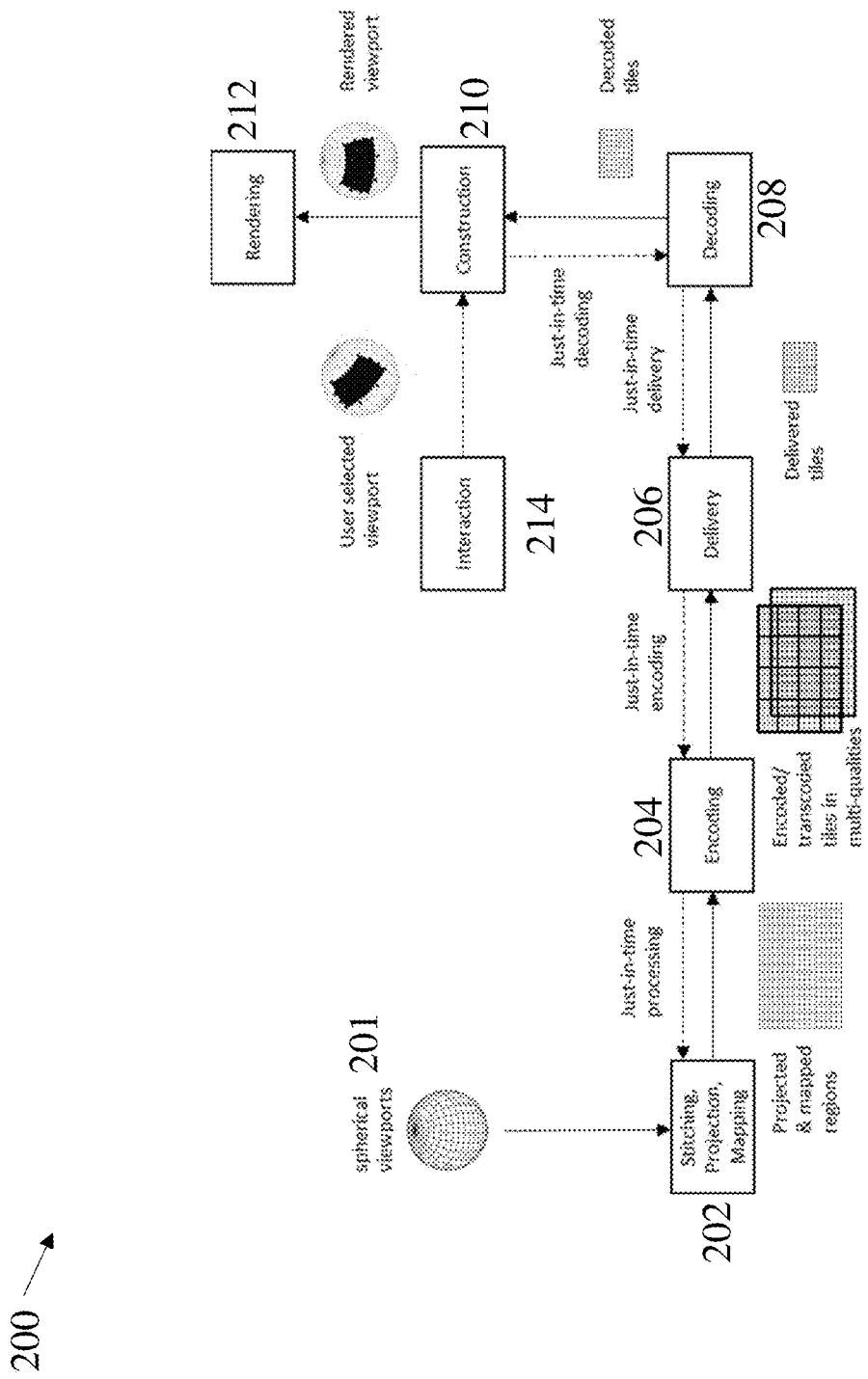
FIG. 2 a viewport dependent content flow process for virtual reality (VR) content, according to some examples.

FIG. 2 shows a viewport dependent content flow process 200 for VR content, according to some examples. As shown, spherical viewports 201 (e.g., which could include the entire sphere) undergo stitching, projection, mapping at block 202 (to generate projected and mapped regions), are encoded at block 204 (to generate encoded/transcoded tiles in multiple qualities), are delivered at block 206 (as tiles), are decoded at block 208 (to generate decoded tiles), are constructed at block 210 (to construct a spherical rendered viewport), and are rendered at block 212. User interaction at block 214 can select a viewport, which initiates a number of "just-in-time" process steps as shown via the dotted arrows.

In the process 200, due to current network bandwidth limitations and various adaptation requirements (e.g., on different qualities, codecs and protection schemes), the 3D spherical VR content is first processed (stitched, projected and mapped) onto a 2D plane (by block 202) and then encapsulated in a number of tile-based (or sub-picture-based) and segmented files (at block 204) for delivery and playback. In such a tile-based and segmented file, a spatial tile in the 2D plane (e.g., which represents a spatial portion, usually in a rectangular shape of the 2D plane content) is typically encapsulated as a collection of its variants, such as in different qualities and bitrates, or in different codecs and protection schemes (e.g., different encryption algorithms and modes). In some examples, these variants correspond to representations within adaptation sets in MPEG DASH. In some examples, it is based on user's selection on a viewport that some of these variants of different tiles that, when put together, provide a coverage of the selected viewport, are retrieved by or delivered to the receiver (through delivery block 206), and then decoded (at block 208) to construct and render the desired viewport (at blocks 210 and 212).

As shown in FIG. 2, the viewport notion is what the end-user views, which involves the angle and the size of the region on the sphere. For 360 degree content, generally, the techniques deliver the needed tiles/sub-picture content to the client to cover what the user will view. This process is viewport dependent because the techniques only deliver the content that covers the current viewport of interest, not the entire spherical content. The viewport (e.g., a type of spherical region) can change and is therefore not static. For example, as a user moves their head, then the system needs to fetch neighboring tiles (or sub-pictures) to cover the content of what the user wants to view next.

Figure 3:
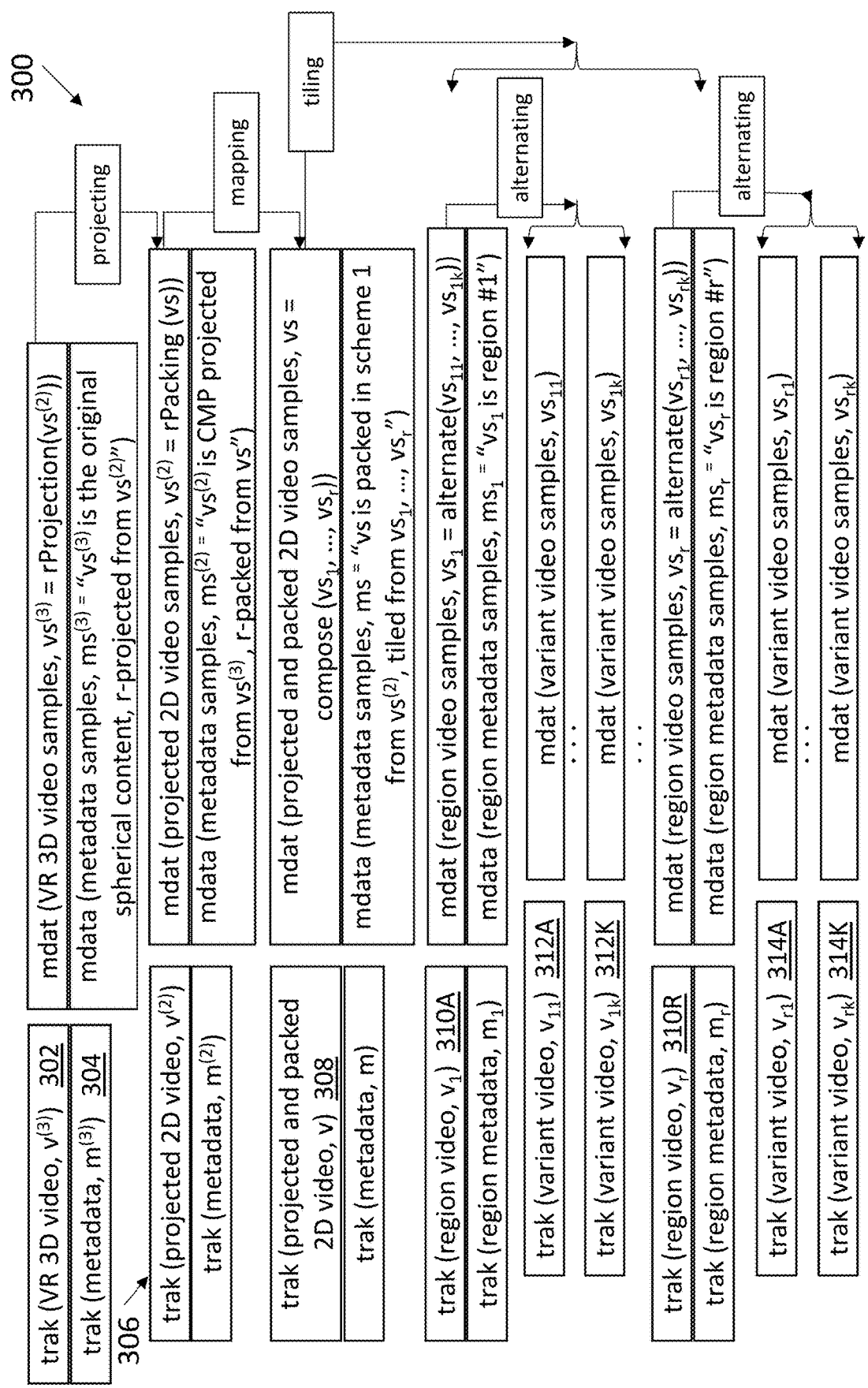
FIG. 3 shows an exemplary track hierarchical structure, according to some embodiments.

A flat file structure for the content could be used, for example, for a video track for a single movie. For VR content, there is more content than is sent and/or displayed by the receiving device. For example, as discussed herein, there can be content for the entire 3D sphere, where the user is only viewing a small portion. In order to encode, store, process, and/or deliver such content more efficiently, the content can be divided into different tracks. FIG. 3 shows an exemplary track hierarchical structure 300, according to some embodiments. The top track 302 is the 3D VR spherical content track, and below the top track 302 is the associated metadata track 304 (each track has associated metadata). The track 306 is the 2D projected track. The track 308 is the 2D big picture track. The region tracks are shown as tracks 310A through 310R, generally referred to as sub-picture tracks 310. Each region track 310 has a set of associated variant tracks. Region track 310A includes variant tracks 312A through 312K. Region track 310R includes variant tracks 314A through 314K. Thus, as shown by the track hierarchy structure 300, a structure can be developed that starts with physical multiple variant region tracks 312, and the track hierarchy can be established for region tracks 310 (sub-picture or tile tracks), projected and packed 2D tracks 308, projected 2D tracks 306, and VR 3D video tracks 302, with appropriate metadata tracks associated them.

In operation, the variant tracks include the actual picture data. The device selects among the alternating variant tracks to pick the one that is representative of the sub-picture region (or sub-picture track) 310. The sub-picture tracks 310 are tiled and composed together into the 2D big picture track 308. Then ultimately the track 308 is reverse-mapped, e.g., to rearrange some of the portions to generate track 306. The track 306 is then reverse-projected back to the 3D track 302, which is the original 3D picture.

The exemplary track hierarchical structure can include aspects described in, for example: m39971, "Deriving Composite Tracks in ISOBMFF", January 2017 (Geneva, CH); m40384, "Deriving Composite Tracks in ISOBMFF using track grouping mechanisms", April 2017 (Hobart, AU); m40385, "Deriving VR Projection and Mapping related Tracks in ISOBMFF;" m40412, "Deriving VR ROI and Viewport related Tracks in ISOBMFF", MPEG 118th meeting, April 2017, which are hereby incorporated by reference herein in their entirety. In FIG. 3, rProjection, rPacking, compose and alternate represent the track derivation TransformProperty items reverse 'proj', reverse 'pack', 'cmpa' and 'cmp1', respectively, for illustrative purposes and are not intended to be limiting. The metadata shown in the metadata tracks are similarly for illustrative purposes and are not intended to be limiting. For example, metadata boxes from OMAF can be used as described in w17235, "Text of ISO/IEC FDIS 23090-2 Omnidirectional Media Format," 120th MPEG Meeting, October 2017 (Macau, China), which is hereby incorporated by reference herein in its entirety.

The number of tracks shown in FIG. 3 is intended to be illustrative and not limiting. For example, in cases where some intermediate derived tracks are not necessarily needed in the hierarchy as shown in FIG. 3, the related derivation steps can be composed into one (e.g., where the reverse packing and reverse projection are composed together to eliminate the existence of the projected track 306).

Version 1 of the Omnidirectional Media Format (OMAF) as MPEG-I Part 2 has been finished and is set forth in w17563, "Revised text of ISO/IEC FDIS 23090-2 Omnidirectional Media Format," April 2018, San Diego, Calif., which is hereby incorporated by reference herein in its entirety. There are a number of desired features (e.g., often referred to as requirements) for MPEG-I, Phase 1b. Among those requirements are support of binocular disparity rendering and content overlay rendering with transparency/opacity. Those features will be in ongoing development in OMAF Version 2, wherein some preliminary proposals using an in-track (item property) metadata box are documented for the related sections on "storage and signaling of overlays for omnidirectional video and images" and "storage of timed text for omnidirectional video."

The latest Editors' input on the working draft (WD) of OMAF, version 2.0 is specified in m42923, "Editors Input Text for OMAF WD Based on Finland AHG Agreements," version 2, July 2018, Ljubljana, Slovenia, which is hereby incorporated by reference herein in its entirety. The document m42923 included storage mechanisms for overlay metadata represented by OverlayStruct( ). For a (media) track, the storage of "static" overlay metadata in OverlayConfigBox is contained in the ProjectedOmniVideoBox. For an item, the storage of "static" overlay metadata in the OverlayConfigProperty is contained in the ItemPropertyContainerBox. For a timed metadata track, the storage of "default" overlay metadata OverlayConfigBox is at the sample entry level, and the storage of "time-variant" overlay metadata for turning on/off of active "static" overlays and additional overlays in OverlayStruct( ) is at the sample level (e.g., at the variant track level, such as the level shown by variant tracks 312A through 312K and variant tracks 314A through 314K in FIG. 3).

The inventors have discovered and appreciated that the techniques suffer from various shortcomings and drawbacks with existing storage mechanisms. For example, some shortcomings relate to the application scope. In m42923, an overlay is described as a "piece of visual media rendered over omnidirectional video or image item or over a viewport." The tie of the static overlay metadata to the ProjectedOmniVideoBox of a track limits the application to only projected omnidirectional video tracks, which excludes other media tracks like non-omnidirectional (e.g., regular 2D) video tracks and timed text tracks. There is also no linkage between the storage mechanism and the storage mechanism for timed text tracks in the OMAF version 1, as they do not share any overlay_id.

Figure 5:
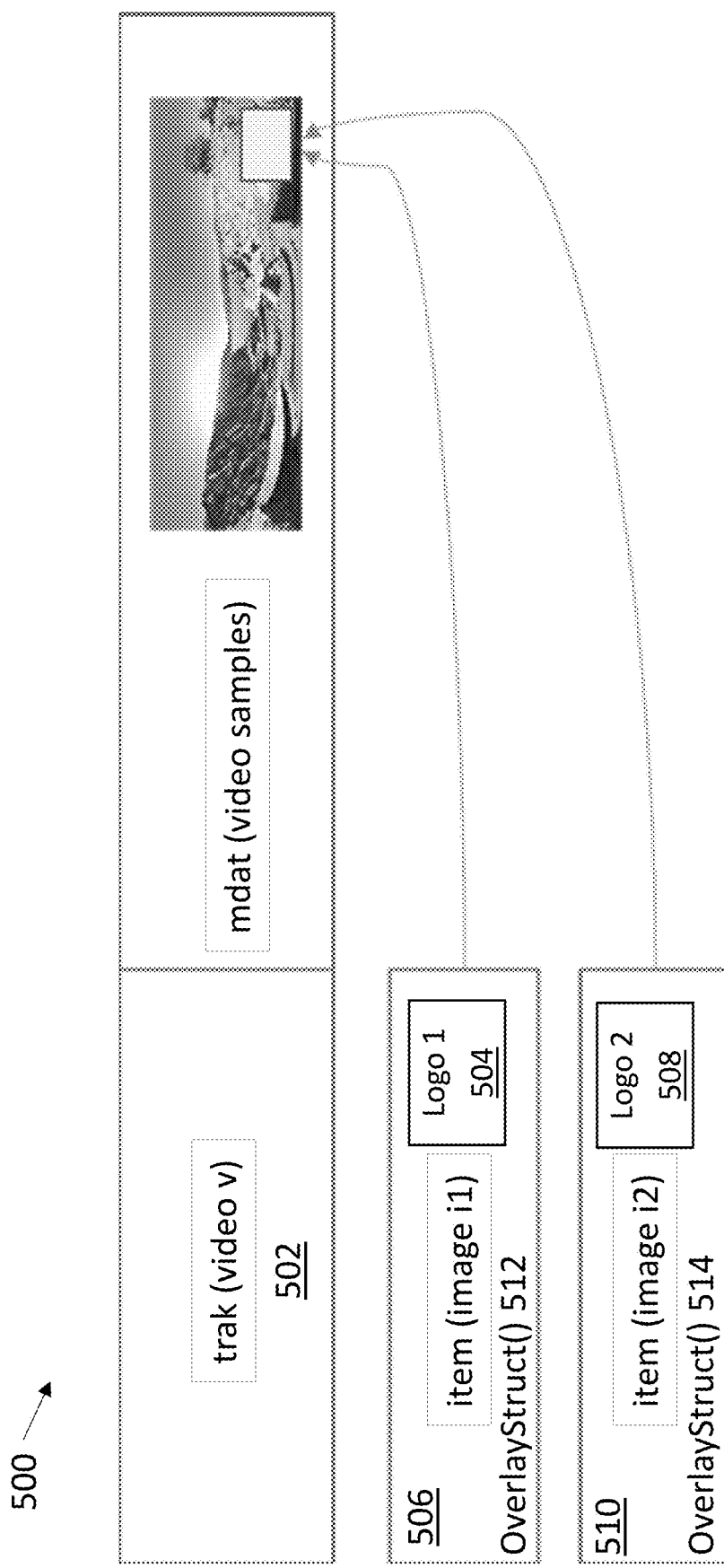
FIG. 5 shows an example of an overlay, according to some examples.

As another example, some shortcomings relate to storage efficiency. Currently in OMAF, the overlay metadata is signaled within the overlay content itself. FIG. 4 shows exemplary syntaxes for a SingleOverlayStruct( ) 400 and OverlayStruct( ) 450, according to some examples. FIG. 5 shows an example 500 of an overlay in ISOBMFF, according to some examples. In the example 500, the video track v 502 includes a region that can be overlaid with either logo 1 504, which is specified by an image item i1 506, or logo 2 508, which is specified by an image item i2 510. Each image item i1 506 and i2 510 includes an associated OverlayStruct( ) 512, 514, respectively.

Signaling the overlay metadata in the overlay content can result in storage inefficiencies. For example, consider a situation where there are m video tracks, each of which has a region of a same size that can be overlaid in a same manner (in terms of overlay control attributes) with any of n image items of a same size (or n timed text tracks in different languages). Using the storage mechanisms for overlay tracks and items, each of the video tracks will have to have n instances of the same SingleOverlayStruct( ) (e.g., n=num_overlays in OverlayConfigBox of the track), and each of the image items will have to have m instances of the same SingleOverlayStruct( ) (i.e., m=num_overlays in OverlayConfigProperty of the item). This results in a storage of n*m instances of the same SingleOverlayStruct( ) in the tracks and n*m instances of the same SingleOverlayStruct( ) in the items, with n*m different overlay_id values. This is due, in part, to an overlay being identified by all of those tracks and items that contain SingleOverlayStruct( ) with a same overlay_id value, and there is no other association among the tracks and items belonging to an overlay.

As a further example, deficiencies exist for processing efficiency. The storage of static overlay metadata within media tracks or items themselves is not efficient, and sometimes not feasible, for performing the overlays. For example, in order to figure out if there is any single overlay identified by any overlay_id value and which tracks and items are involved in the overlay, a device has to search through all tracks and items for all possible OverlayStruct ( ) to find a match. Moreover, when the media tracks or items are encrypted, figuring out which tracks and items are involved in an overlay is infeasible because the content cannot be determined until rendering and therefore a match can only be determined at rendering time.

As another example, deficiencies exist for dynamic flexibility since the overlay metadata is hard coded in the tracks themselves. For example, in the use cases where (a) overlays are to be determined in a post-production phase, (b) tracks and items can be involved in overlays in an m-to-n manner where m and n are not pre-determined, and/or (c) overlays are dynamic as required by the target advertisement (e.g., a video might have an advertisement spot that can be overlaid with different images depending on locations and users the video is played at and for), hard coding of overlay metadata inside media tracks and items is not flexible to support these use cases. It is worth noting the time-variant aspect is different from the dynamic aspect.

As a further example, deficiencies exist for item references. The overlay timed metadata track is linked to the respective visual media tracks by utilizing the 'cdsc' track reference. However, this track reference does not address signaling of overlays for image items. This is due to the fact that the track reference type 'cdsc' is only for tracks.

As an additional example, deficiencies exist due to under-specified semantics. When there are additional overlays that need to be carried in an overlay timed metadata track, it is not clear what the signaled OverlayStruct( ) is used for and how it is related to the active overlays signaled in the metadata track and the media tracks the metadata track refers to.

The techniques provided herein address these and other deficiencies. The techniques provide for specifying overlay metadata independent of the actual content. In some embodiments, the techniques provide for signaling media content overlays in ISOBMFF, such as that specified in ISO/IEC 14496-12, "Information technology—coding of audio-visual objects: ISO base media file format," $5^{th}$ edition, May 2015, which is hereby incorporated by reference herein in its entirety. More specifically, the techniques provide for signaling an overlay of media content carried in ISOBMFF visual media tracks by using timed metadata tracks.

Figure 6:
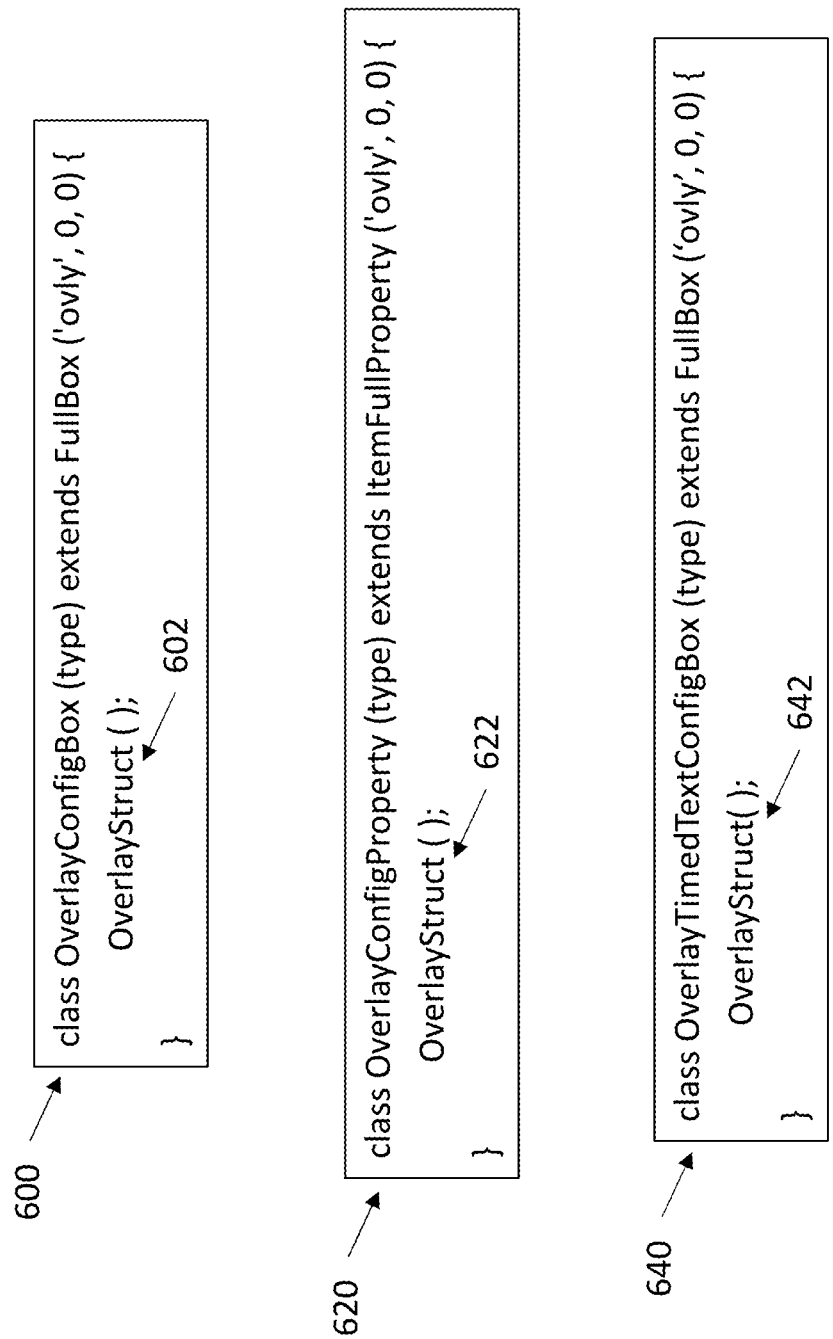
FIG. 6 shows exemplary syntaxes for configuration metadata that can be used to decouple overlays from projected omnidirectional video, according to some embodiments.

In some embodiments, the techniques decouple overlays from projected omnidirectional video. Rather than referring to an overlay as omnidirectional as described above, an overlay can be considered to be a piece of visual media (e.g., video, an image item or timed text) rendered over omnidirectional video, or over an image item, and/or over a viewport. The visual media can therefore be a 2D or omnidirectional video or timed text carried in a track or an image carried in an item. FIG. 6 shows exemplary syntaxes for configuration metadata that can be used to decouple overlays from projected omnidirectional video, according to some embodiments. The configuration boxes 600, 640 and property 620 can be used to store the static overlay metadata OverlayStruct( ), as described further herein.

As shown, the overlay configuration box 600 can be of the box type 'ovly' and of the container SchemeInformationBox, is not mandatory, and the quantity can be zero or one. As shown, the OverlayConfigBox is structured to store the static metadata OverlayStruct( ) 602 of the overlays contained in the track. The overlay item property 620 can be of the box type 'ovly' and of the container ItemPropertyContainerBox, is not mandatory, and the quantity can be zero or one. The OverlayConfigProperty is structured to store the static metadata OverlayStruct( ) 622 of the overlays contained in the associated image item. The overlay timed text configuration box 640 can be of the box type 'ovly' and of the container XMLSubtitleSampleEntry or WVTTSampleEntry. The OverlayTimedTextConfigurationBox can be mandatory, e.g., for timed text tracks associated with an omnidirectional video track. The quantity can be one, e.g., for timed text tracks associated with an omnidirectional video track. As shown, the OverlayTimedTextConfigurationBox 640 is structured to store the static metadata OverlayStruct( ) 642 of the overlays contained in this track.

The techniques described herein allow overlay metadata to be extended to track references in timed metadata tracks. Track derivation techniques, such as that described in w17575, "Technologies under Consideration for ISOBMFF," April 2018, San Diego, Calif. USA, which is hereby incorporated by reference herein in its entirety, can allow a track reference with the reference type 'dtrk' to refer to visual tracks and items. However, there do not exist mechanisms for an overlay timed metadata track to make reference to tracks and items in overlays.

In some embodiments, an overlay metadata track includes a TrackReferenceTypeBox with reference_type equal to 'ovly' listing both the track ID values of all tracks and the item ID values of all image items used by overlay samples of the overlay metadata track. An ID value in the 'ovly' box can be resolved to a track ID whenever the file contains a track with such ID, and is resolved to an item ID otherwise. The techniques can use an extension to track_IDs (e.g., by extending track_IDs as provided in Clause 8.3.3.3 in ISO/IEC 14496-12) by allowing item_id values. For example, track_IDs can be an array of integers providing the track or item identifiers of the referenced tracks or items or track_group_id values of the referenced track groups. Each value of track_IDs [i], where i is a valid index to the track_IDs H array, is an integer that provides a reference from the containing track to the track with track_id equal to track_IDs[i], to the item with item_id equal to track_IDs [i] or to the track group with both track_group_id equal to track_IDs [i] and (flags & 1) of TrackGroupTypeBox equal to 1. When a track_group_id value is referenced, the track reference can apply to each track of the referenced track group individually unless stated otherwise in the semantics of particular track reference types. In the array, the array may be constrained such that there shall be no duplicated value; however, a track_id may appear in the array and also be a member of one or more track groups for which the track_group_ids appear in the array. This can mean that in forming the list of tracks, after replacing track_group_ids by the track_ids of the tracks in those groups, there might be duplicate track_ids.

In some embodiments, the value 0 may not be allowed. In some embodiments, when an ID value equal to zero (0) is present in the track_IDs array, it can represent a placeholder for a non-zero track ID value or a non-zero item ID that is to be resolved at the time the overlay is performed (e.g., to allow for dynamic overlay).

In some embodiments, by extending the track reference to allow references to items in overlays, timed metadata tracks can be used to store and signal metadata for static, time-variant and/or dynamic overlays including media items. Thus, the overlays can be signaled within the metadata tracks. The timed metadata track can carry overlay information including how many tracks and/or items are involved with the overlay (e.g., since if there is a reference to one track or item, the timed metadata track can indicate there is an overlay). In some embodiments, timed metadata tracks can store and signal such metadata using, for example, the syntax and semantics of OverlayStruct( ) discussed in m42923. This can allow the timed metadata tracks to carry the OverlayStruct( ) information instead of using the media item or track itself. For example, an overlay timed metadata track can indicate one or more of overlay metadata (e.g., in the form of an OverlayStruct( ) associated with referenced tracks and items), time-variant overlays (e.g., which are overlays being active over time), and/or dynamic overlays (e.g., which are overlays whose involved tracks or items are determined dynamically). The overlay timed metadata track can be linked to the respective visual media tracks and items by utilizing the 'ovly' track reference.

FIG. 7 shows an exemplary syntax for an overlay sample entry 700, according to some embodiments. For illustrative purposes, an example can include OverlaySampleEntry, which will be used to explain the concepts herein, although one of skill can appreciate that other nomenclatures, structures, and/or fields can be used without departing from the spirit of the invention. As shown, the overlay sample entry extends metadata sample entry 'ovly.' The sample entry of an overlay timed metadata track contains a list of Overlay-Struct( ) structures 702 that correspond to the list of referenced tracks and/or items. The num_references 704 is equal to the number of tracks and items referenced by the overlay timed metadata track. Each OverlayStruct( ) 702 is associated with its corresponding track or item, as if it is contained in its respective OverlayConfigBox, OverlayConfigProperty, and/or OverlayTimedTextConfigBox, stored in its corresponding video track, image item or timed-text track, respectively. When an OverlayStruct( ) is associated with its corresponding track or item whose id value is equal to zero (0), then it can be resolved to a track or item with a non-zero id value. The time-variant_overlay_flag 706 can be used to specify, at the sample level, whether the overlays are static or will change from time to time or from sample to sample. For example, a time-variant_overlay_flag 706 equal to 0 can specify that all the specified overlays are static and they are not time-variant, whereas a time-variant_overlay_flag 706 equal to 1 specifies that the overlays are time-variant.

FIG. 7 also shows an exemplary syntax for an overlay sample 750, according to some embodiments. For illustrative purposes, an example can include an OverlaySample class, which will be used to explain the concepts herein, although one of skill can appreciate that other nomenclatures, structures, and/or fields can be used without departing from the spirit of the invention. The overlay sample 750 can be used, for example, if the time-variant_overlay_flag 706 indicates that the overlays are time-variant to indicate at the sample level which overlay is active. The overlay sample 750 includes num_active_overlays_by_id 752, which can be used to specify the number of overlays from the OverlayStruct( ) structures listed in the sample entry OverlaySampleEntry that are active. A value of 0 can indicate that no overlays from the sample entry are active. The active_overlay_id 754 can provide an overlay identifier for the overlay signaled from the sample entry, which is currently active. For each active_overlay_id 754, the OverlayStruct( ) structures listed in the sample entry OverlaySampleEntry include an overlay with a matching overlay_id value equal to active_overlay_id 754. Only the active overlays can be displayed and all (inactive) others shall not displayed at each sample. In some embodiments, when the time-variant_overlay_flag is equal to 1, the num_active_overlays_by_id of a sample is not required to be equal to the total number of overlays provided in the sample entry, and the set of active_overlay_id 754 values of a sample is not required to be the same as the set of overlay_id values in the sample entry. When the time-variant_overlay_flag is equal to 0, the overlays listed in the sample entry can be active by default (e.g., the non-time-variant, static overlays). The activation of particular overlays by a sample can result in deactivation of any previously signaled overlays from previous sample(s).

For example, if a first image is active for twenty seconds, then for the samples within the first twenty seconds the overlay sample 750 can indicate which image is active by providing the active_overlay_id 754 of that first image. If for the next twenty seconds a second image is active, then for samples in the next twenty seconds, the active_overlay_id 754 indicates the second image is active.

Some examples of the techniques described herein follow. For purposes of these examples, as shown in FIGS. 8A-8D, there is an omnidirectional video track v 802, and two image items i1 804 and i2 806. The track v 802 has an ad spot which can be overlaid by either image i1 804 (which is an advertiser's logo 1 808) or i2 810 (which is an advertiser's logo 2 810), resulting in two overlays of i1 804 and i2 806 over v 802 that are identified with overlay_id values 1 and 2. As one example, to implement static overlays within media tracks and items, the storage mechanism for static overlays in m42923 can be used such that the overlay metadata is stored in the media tracks and items, respectively, as follows, with two SingleOverlayStruct ( ) structures within OverlayStruct ( ) for the video track (e.g., one for overlay_id 1 and one for overlay_id 2) and one SingleOverlayStruct ( ) structure within OverlayStruct ( ) for each of the image items (e.g., for overlay_id 1 and 2, respectively).

Figure 8A:
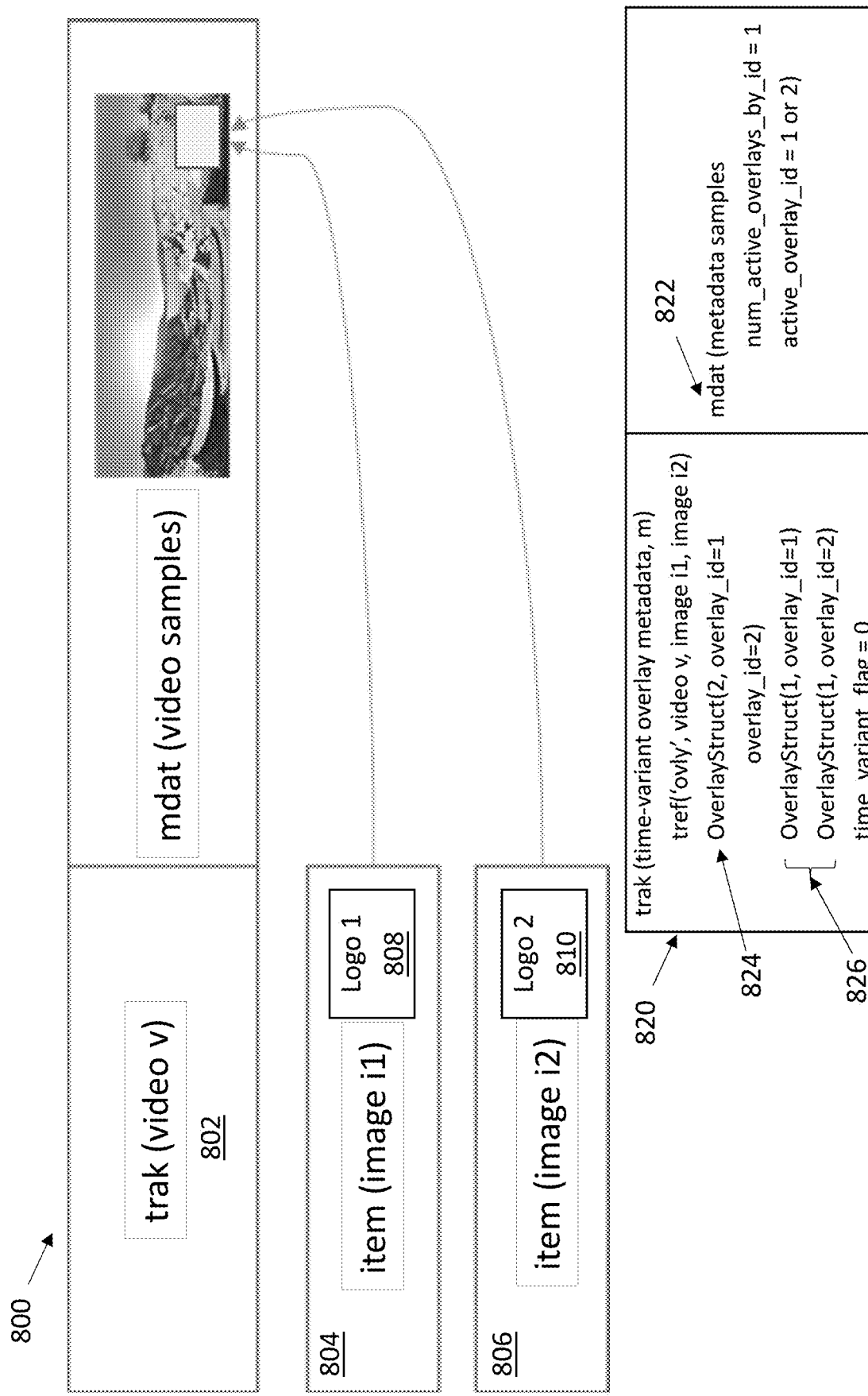
FIG. 8A shows an example of time-variant overlays using overlay timed metadata tracks, according to some embodiments.

FIG. 8A shows an example 800 of time-variant overlays using overlay timed metadata tracks, according to some embodiments. To signal time-variant overlays between the two overlays 1 and 2, the overlay timed metadata track 820 can be used, with the time_variant_flag equal to 1, and one active overlay of either 1 (with image 1) or 2 (with image 2), as indicated by the mdat 822 allowing just one overlay with active_overlay_id equal to 1 or 2. The timed metadata track 820 shows two alternatives for specifying the OverlayStruct( ). The first alternative 824 includes a single OverlayStruct( ) that indicates two overlays together for overlay id=1 and 2. The second alternative 824 includes a separate OverlayStruct( ) for each overlay id=1 or 2.

Figure 8B:
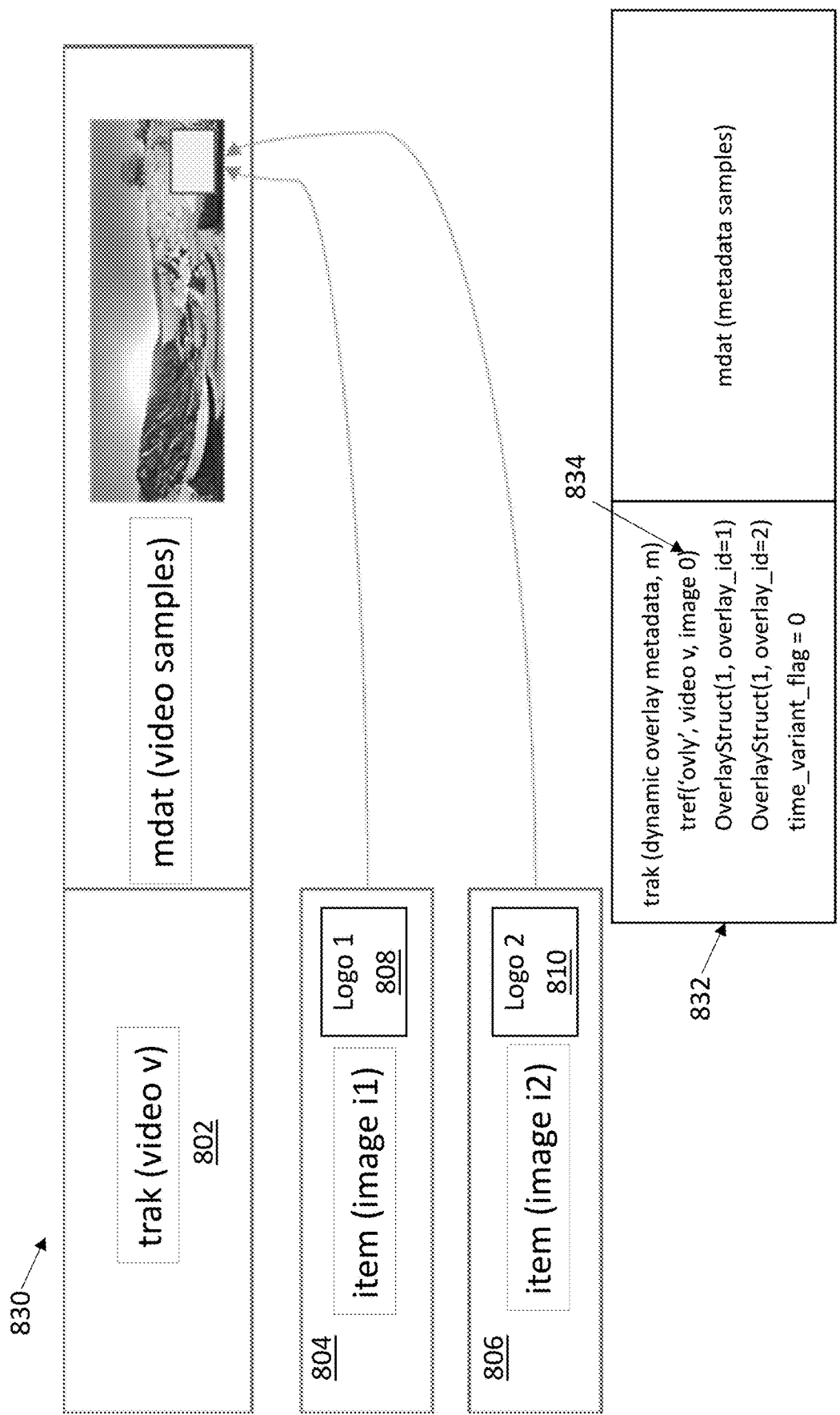
FIG. 8B shows an example of dynamic overlays using overlay timed metadata tracks, according to some embodiments.

FIG. 8B shows an example 830 of dynamic overlays using overlay timed metadata tracks, according to some embodiments. To signal dynamic overlays between the two images i1 804 and i2 806 over video v 802, the overlay timed metadata track 832 can be used, with image item id 834 equal to 0, to allow variable substitution for a dynamically selected image. For a dynamic overlay, the track selected for the overlay is not specified in the mdat, rather a placeholder is used so that it is left up to further processing to specify what content will be overlaid (e.g., it can be specified at a later time which content to include for the overlay, such as at the time of rendering).

Figure 8C:
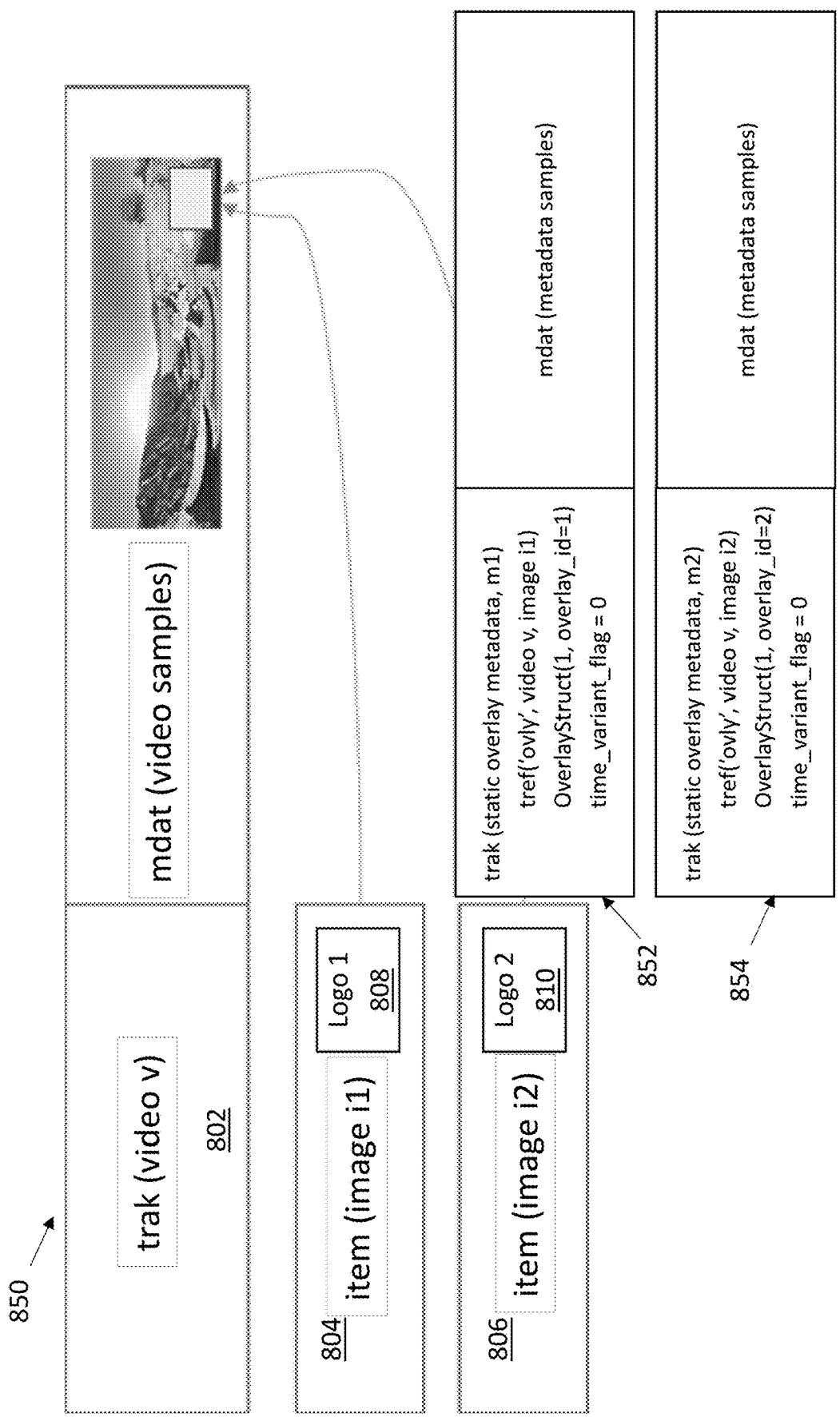
FIG. 8C shows an example of static overlays using overlay timed metadata tracks, according to some embodiments.

FIG. 8C shows an example 850 of static overlays using overlay timed metadata tracks, according to some embodiments. To signal static overlays of i1 804 or i2 806 over v 802, two (2) timed metadata tracks, m1 852 and m2 854 can be used, each with a time_variant_flag equal to 0 to indicate that the overlay does not change over time. In some examples, since there are two timed metadata tracks 852 and 854, it can be left up to the application to choose which timed metadata track to use so that the application can select what content to use for the overlay.

Figure 8D:
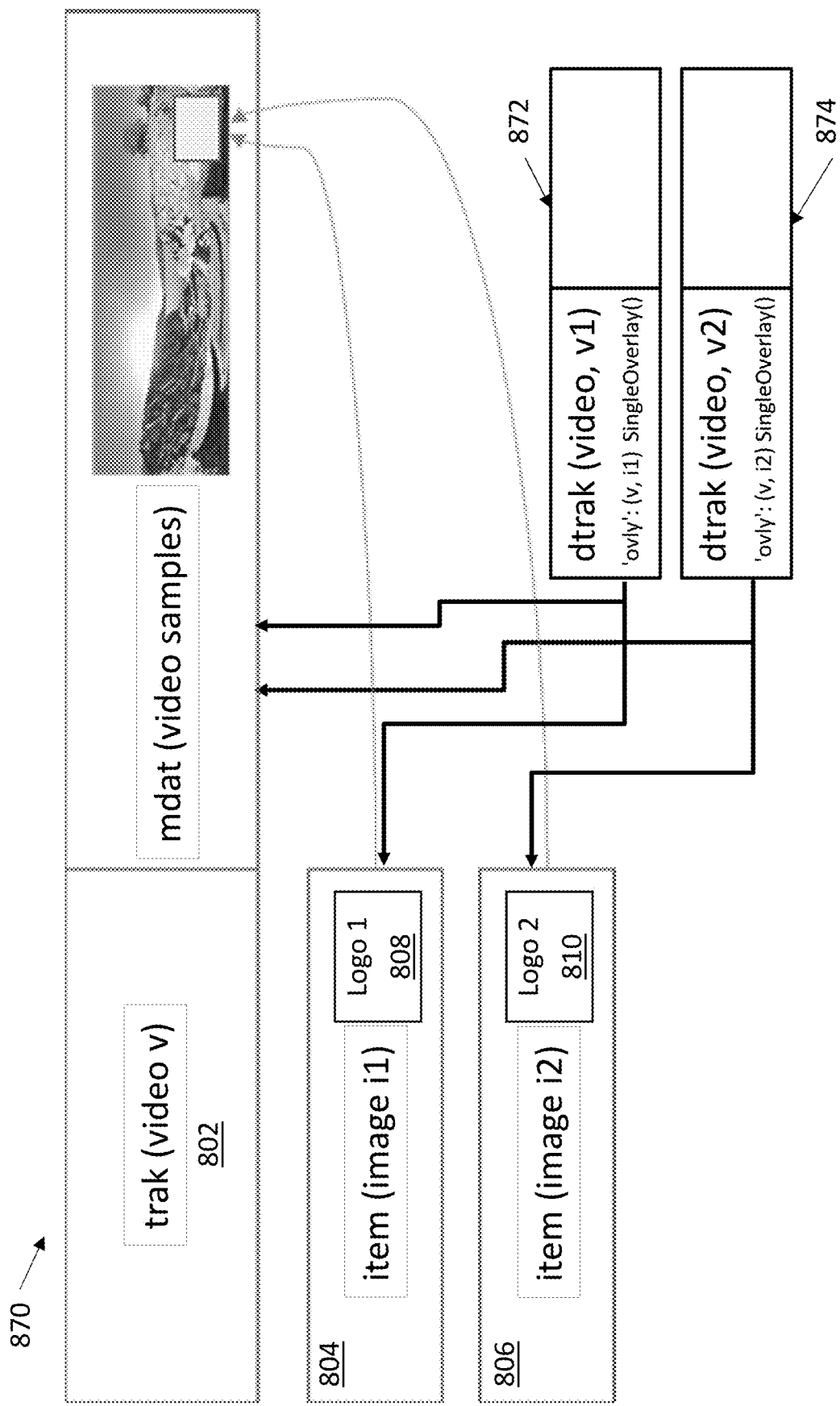
FIG. 8D shows an example of signaling of overlays using overlay track derivation, according to some embodiments.

FIG. 8D shows an example 870 of signaling of overlays using overlay track derivation, according to some embodiments. For example, if there is a main video track and want to overlay content, can have another track represent the overlay content. In some embodiments, different derived tracks can be used to overlay the content, such that one derived track can overlay first overlay content, a second derived track can overlay second overlay content, and so on. In some embodiments, the overlay content and derived tracks can be at the levels of the track hierarchy where the overlay content and back ground content are composed and/or derived. For example, if the overlay or background is an omnidirectional video whose content has been processed (e.g., projected, packed, sub-divided, and multiple transcoded) and is carried in variant tracks, then the track reference to the overlay or background in the overlay derived track will be the track_ID of its derived track for the omnidirectional (spherical) content.

In some embodiments, overlays can be signaled using the mechanisms for derived visual tracks provided in m42908, "Signaling of Overlays for Omnidirectional Video and Images using Timed Metadata Tracks in ISOBMFF," July 2018, Ljubljana, Slovenia, which is hereby incorporated by reference herein in its entirety. For example, the transform property 'tocp' for track overlay composition can be used from m42908. However, 'tocp' does not utilize the OverlayStruct( ) structure described herein. Example 870 shows two derived visual tracks 872 and 874, each of which use an exemplary transform property 'ovly' for overlay track derivation using the metadata provided in the OverlayStruct( ) structure. In the example shown in FIG. 8D, two separate overlay derived tracks 872, 874 are shown for two separate single overlays. In some examples, a single derived track can use OverlayStruct( ) to reference both images so that both images are put onto the background.

In some embodiments, a sample transform property can indicate how many overlay structures are within a derived track. For example, if there is only one overlay then the transform property can overlay that content, while if there are two, the transform property can indicate to overlay both. In some embodiments, the overlay 'ovly' transform property, when present, can have a number of input entries num_input greater or equal to 1, and the input entities are visual tracks and items. The 'ovly' transform property can specify a derived track, each of whose samples is the sample image of the first input track or image overlaid with sample images of the other input tracks and items in the layering order that is same as the order they are listed (e.g., the bottom-most input image first and the top-most input image last).

FIG. 9 shows an exemplary syntax 900 for an 'ovly' transform property, according to some embodiments. The num_flag_bytes field 902 specifies the number of bytes allocated collectively by the overlay_control_flag [i] syntax elements used in SingleOverlayStruct( ). The num_flag_bytes field 902 to 0 can be reserved. The num_inputs field 904 can specify the number of input entries to this track derivation operation. The SingleOverlayStruct ( ) can be part of and/or all of the syntax specified in, for example, w17563. The i-th listed instance of SingleOverlayStruct ( ) structures can be associated with the i-th listed input visual track or item, and can provide the overlay metadata for the track or item. In some embodiments, such as for purposes of deriving an overlay track, some of the attributes in SingleOverlayStruct ( ) can be modified. For example, since the order the input tracks and items determines the layering order of the overlaying sample images, there may be no need for the overlay ordering related structures and attributes. As another example, since a derived overlay track, when rendered, can display the overlay content from all the input tracks and items, there may not be any need to signal overlay_id. In some embodiments, the overlay track derivation can be used mainly for static overlays. To accommodate time-variant overlays, in some embodiments the techniques can include using a number of in-stream structures in MPEG file formats, such as Aggregator and Extractor in N16169, "Text of ISO/IEC FDIS 14496-15 $4^{th}$ edition," June 2016, Geneva, CH, which is hereby incorporated by reference herein in its entirety, for constructing time-variant overlay tracks from other (derived) overlay tracks.

The MPEG Dynamic Adaptive Streaming over HTTP (DASH) protocol is an adaptive bitrate streaming technique that leverages conventional HTTP web servers to deliver adaptive content over the Internet. MPEG DASH breaks the content into a sequence of small file segments, each of which includes a short period of multimedia content that is made available at a variety of different bit rates. When using MPEG DASH, a client can select which of the various bit rates to download based on the current network conditions, often being configured to select the highest bit rate that can be downloaded without affecting playback. Thus, the MPEG DASH protocol allows a client to adapt to changing network conditions.

For DASH applications, the content usually has a corresponding Media Presentation Description (MPD) file. The MPD provides sufficient information for the DASH client to facilitate adaptive streaming of the content by downloading the media segments from an HTTP DASH server. The MPD is an Extensible Markup Language (XML) document that contains information about the media segments, their relationships and information necessary for the HTTP DASH client to choose among the segments, and other metadata that may be needed by the HTTP DASH client.

The MPD can have a hierarchical structure, with the "MPD" element being the root element, which can include various parts such as basic MPD settings, Period, Adaptation Set, Representation, Segment, and/or the like. The Period can describe a part of the content with a start time and a duration. Periods can be used, for example, to represent scenes or chapters, to separate ads from program content, and/or the like. The Adaptation Set can contain a media stream or a set of media streams. In a basic example, a Period could have one Adaptation Set containing all audio and video for the content. But, more typically (e.g., to reduce bandwidth), each stream can be split into a different Adaptation Set. For example, multiple Adaptation Sets can be used to have one video Adaptation Set, and multiple audio Adaptation Sets (e.g., one for each supported language). Representations allow an Adaptation Set to contain the same content encoded in different ways. For example, it is common to provide Representations in multiple screen sizes, bandwidths, coding schemes, and/or the like. Segments are the actual media files that the DASH client plays, generally by playing them back-to-back as if they were the same file. Media Segment locations can be described using a BaseURL for a single-segment Representation, a list of segments (SegmentList), a template (SegmentTemplate) with SegmentBase, or xlink (e.g., the xlink in the top level-element, Period). Segment start times and durations can be described with a SegmentTimeline (especially important for live streaming, so a client can quickly determine the latest segment). The BaseURL, SegmentList, and SegmentTemplate are specified in the Period. Segments can be in separate files (e.g., for live streaming), or they can be byte ranges within a single file (e.g., for static or on-demand content).

In some embodiments, the techniques described herein can be used for streaming applications, such as for DASH applications. For example, with the storage and signaling mechanisms of using overlay timed metadata tracks and overlay derived tracks, a track to be constructed from other N visual tracks and items (N>1) can be streamed using DASH (e.g., as described in N17233, "Text of ISO/IEC 23009-1 $3^{rd}$ edition," April 2018, San Diego, Calif. USA, which is hereby incorporated by reference herein in its entirety) and ISOBMFF (e.g., as described in N16169).

Figure 10:
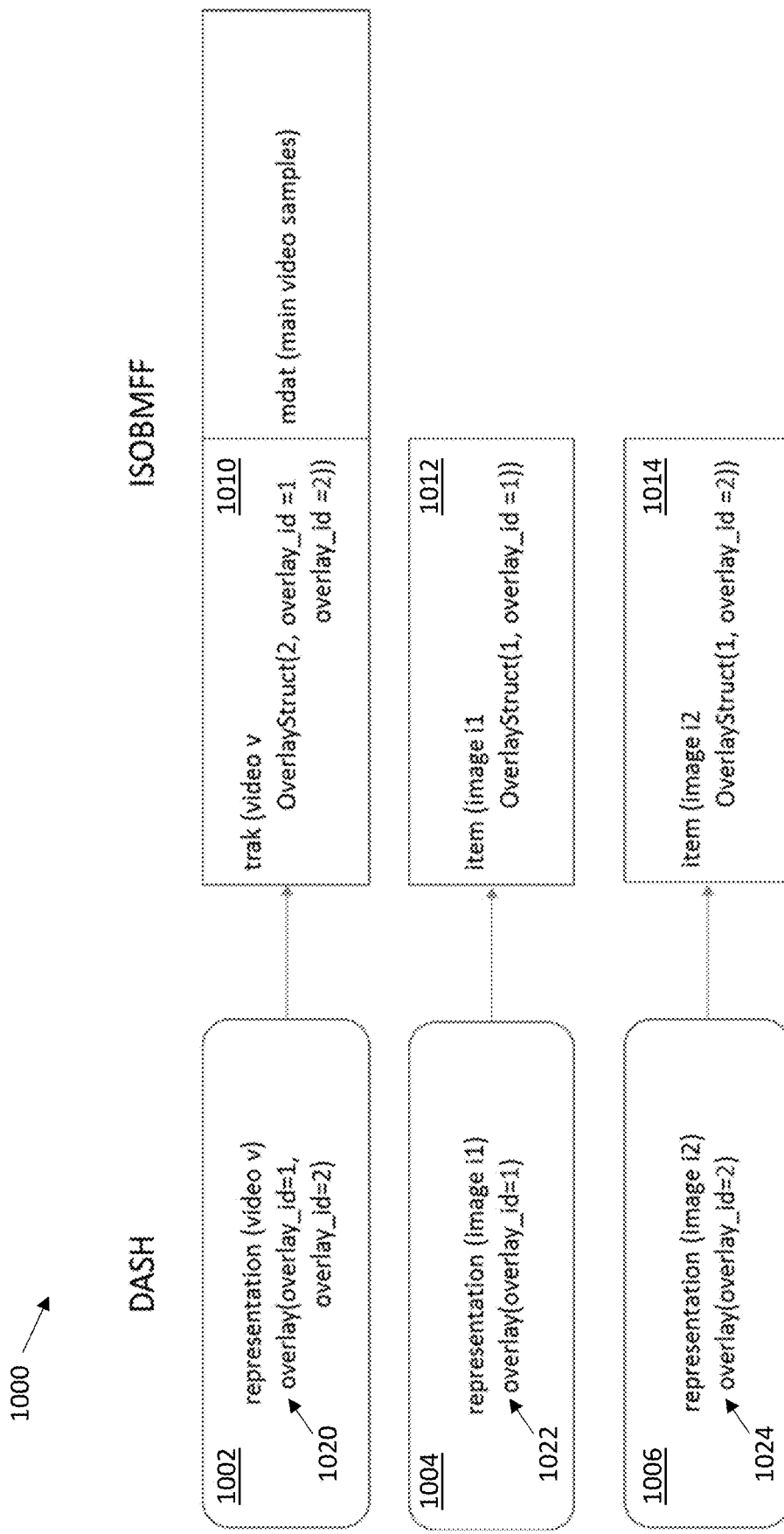
FIG. 10 shows an example of static overlays within media tracks and items, according to some embodiments.

FIG. 10 shows an example 1000 of static overlays within media tracks and items, according to some embodiments. As shown, DASH includes a representation for the video v 1002, a representation for the image i1 1004, and a representation for the image i2 1006. The ISOBMFF includes a corresponding trak 1010 for the video v, an item 1012 for the image i1, and an item 1014 for the image i2. As shown, a descriptor 'overlay' is introduced for each of the DASH representations, such that video v 1002 includes an overlay descriptor 1020, the image i1 representation 1004 includes an overlay descriptor 1022, and the image i2 1006 includes an overlay descriptor 1024. For DASH, for example, the overlay descriptor 1020 can be included in the video v 1002 to indicate the relationship between the video v and the two overlays, and the representations 1004 and 1006 indicate that the images are overlay content for the video v. For the element overlay, the @schemeIdUri attribute can be used to identify an overlay descriptor scheme. The overlay descriptors can provide sufficient information provided in an OverlayStruct. In some embodiments, the overlay descriptors can be provided in conjunction with the @value and/or extension attributes and elements, such as the overlay_id and/or overlay control information, to enable a DASH client to determine whether it can display the overlaid content. In some embodiments, when no overlay element is present the content shall not be overlaid. In some embodiments, when multiple overlay elements are present with different overlay_id values, each element can describe a key management and protection scheme that is sufficient to access and present the Representation.

Figure 11:
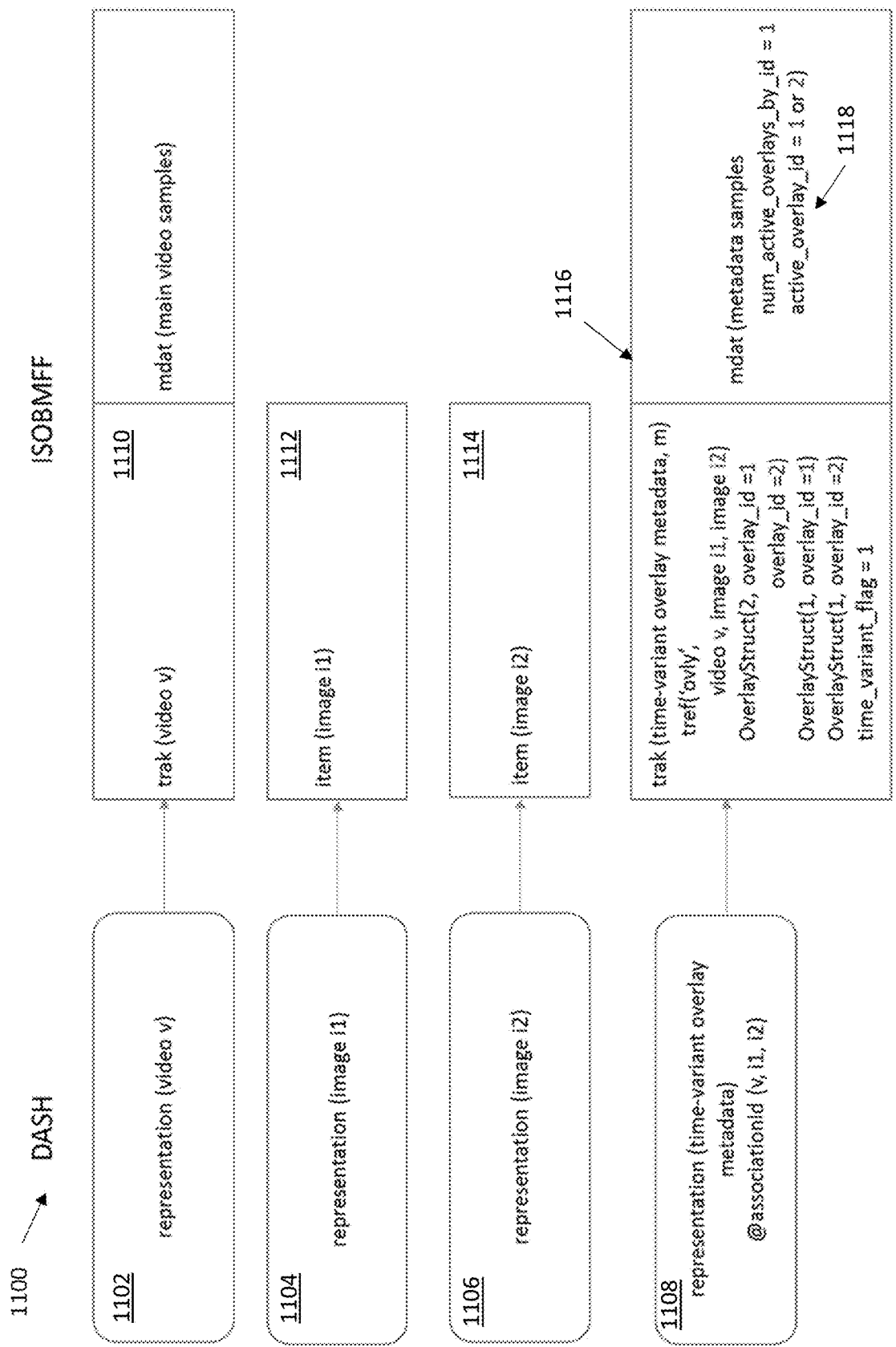
FIG. 11 shows an example of time-variant overlays using overlay timed metadata tracks, according to some embodiments.

FIG. 11 shows an example 1100 of time-variant overlays using overlay timed metadata tracks, according to some embodiments. As shown, DASH includes a representation for the video v 1102, a representation for the image i1 1104, and a representation for the image i2 1106, and a representation 1108 for the time-variant overlay metadata. The ISOBMFF includes a corresponding trak 1110 for the video v, an item 1112 for the image i1, and an item 1114 for the image i2, and a trak 1116 for the time-variant overlay metadata. The time-variant overlay metadata representation shown in the representation 1108 for the time-variant overlay metadata can be used to signal time-variant overlays between the two overlays i1 and i2, with associations with the video representation 1102 and image representations 1104, 1106 for the respective video track 1110 and image items 1112, 1114. As shown, the mdat 1118 indicates that the active overlay (via active_overlay_id) is either 1 or 2.

Figure 12:
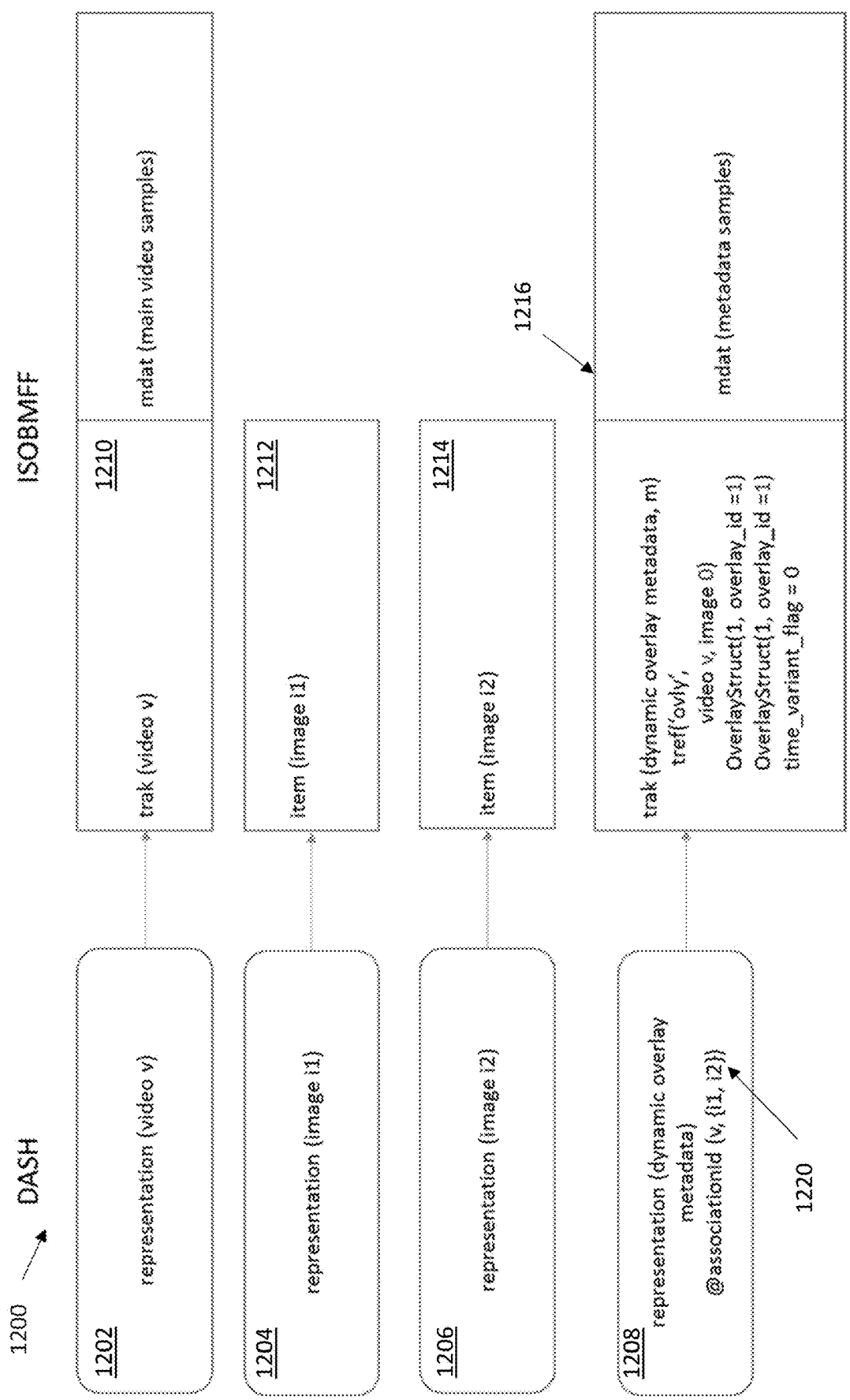
FIG. 12 shows an example of dynamic overlays using overlay timed metadata tracks, according to some embodiments.

FIG. 12 shows an example 1200 of dynamic overlays using overlay timed metadata tracks, according to some embodiments. As shown, DASH includes a representation for the video v 1202, a representation for the image i1 1204, and a representation for the image i2 1206, and a representation 1208 for the dynamic overlay metadata. The ISOBMFF includes a corresponding trak 1210 for the video v, an item 1212 for the image i1, and an item 1214 for the image i2, and a trak 1216 for the dynamic overlay metadata. The dynamic overlay metadata representation 1208 can be used to signal dynamic overlays between the two image items i1 1212 and i2 1214 over video trak v 1210, using the association to the video representation v 1202 and the adaptationSet {i1, i2} 1220 of the two image representations 1204, 1206, to allow variable substitution for a dynamically selected image between image i1 and i2 (e.g., since image i1 or i2 is not specified in the mdat, and therefore acts as a placeholder that can be configured by the application).

Figure 13:
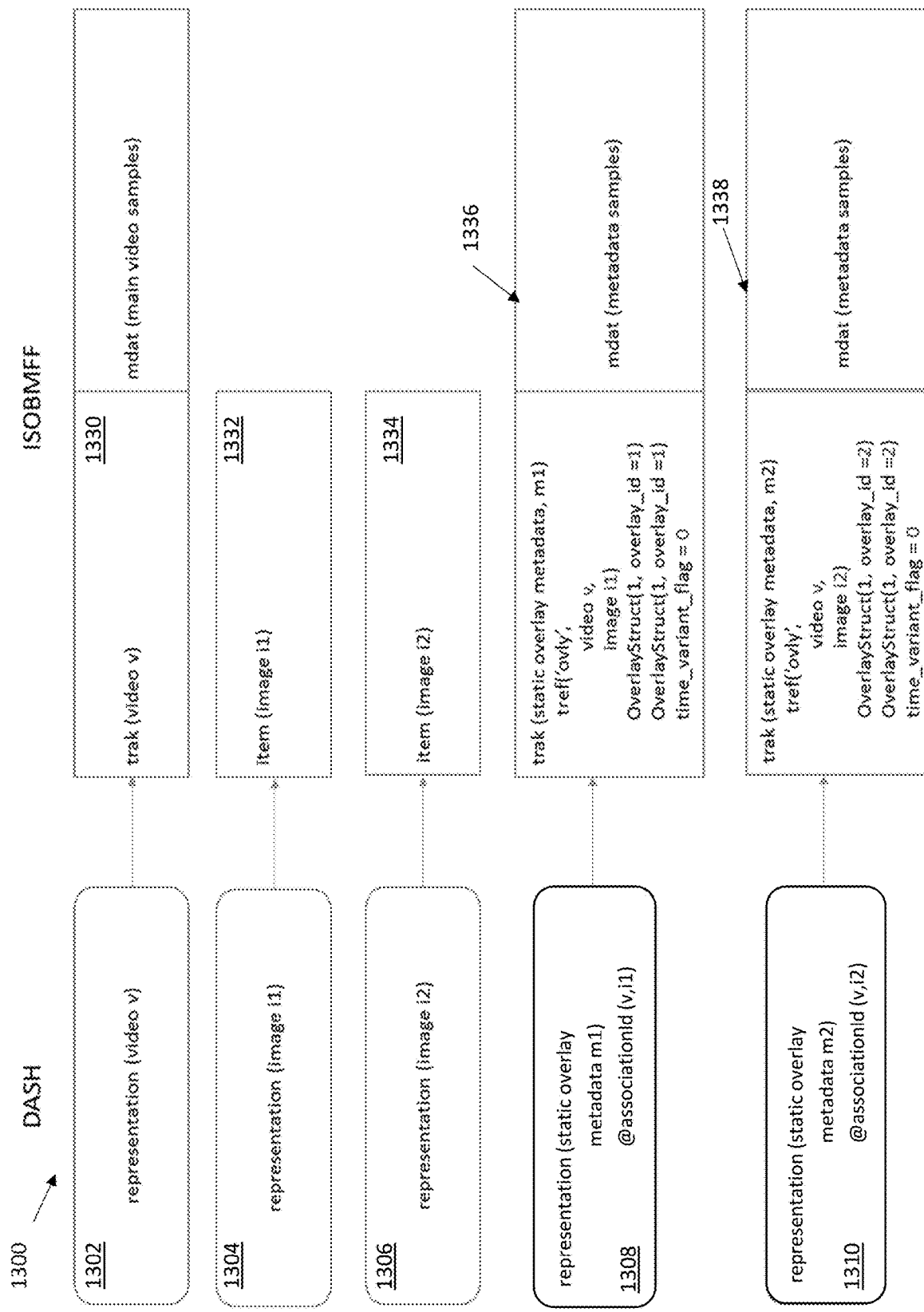
FIG. 13 shows an example of static overlays using overlay timed metadata tracks, according to some embodiments.

FIG. 13 shows an example 1300 of static overlays using overlay timed metadata tracks, according to some embodiments. As shown, DASH includes a representation for the video v 1302, a representation for the image i1 1304, and a representation for the image i2 1306, a representation 1308 for the static overlay metadata m1 for the image i1, and a representation 1310 for the static overlay metadata m2 for the image i2. The ISOBMFF includes a corresponding trak 1330 for the video v, an item 1332 for the image i1, and an item 1334 for the image i2, a trak 1336 for the static overlay metadata m1, and a trak 1338 for the static overlay metadata m2. The two static overlay metadata representations m1 1308 and m2 1310 can be used to signal static overlays of image items i1 1332 or i2 1334 over trak v 1330, each with an association to its video and image representations such that representation m1 1308 has an association of image i1 to video v, and representation m2 has an association of image i2 to video v.

Figure 14:
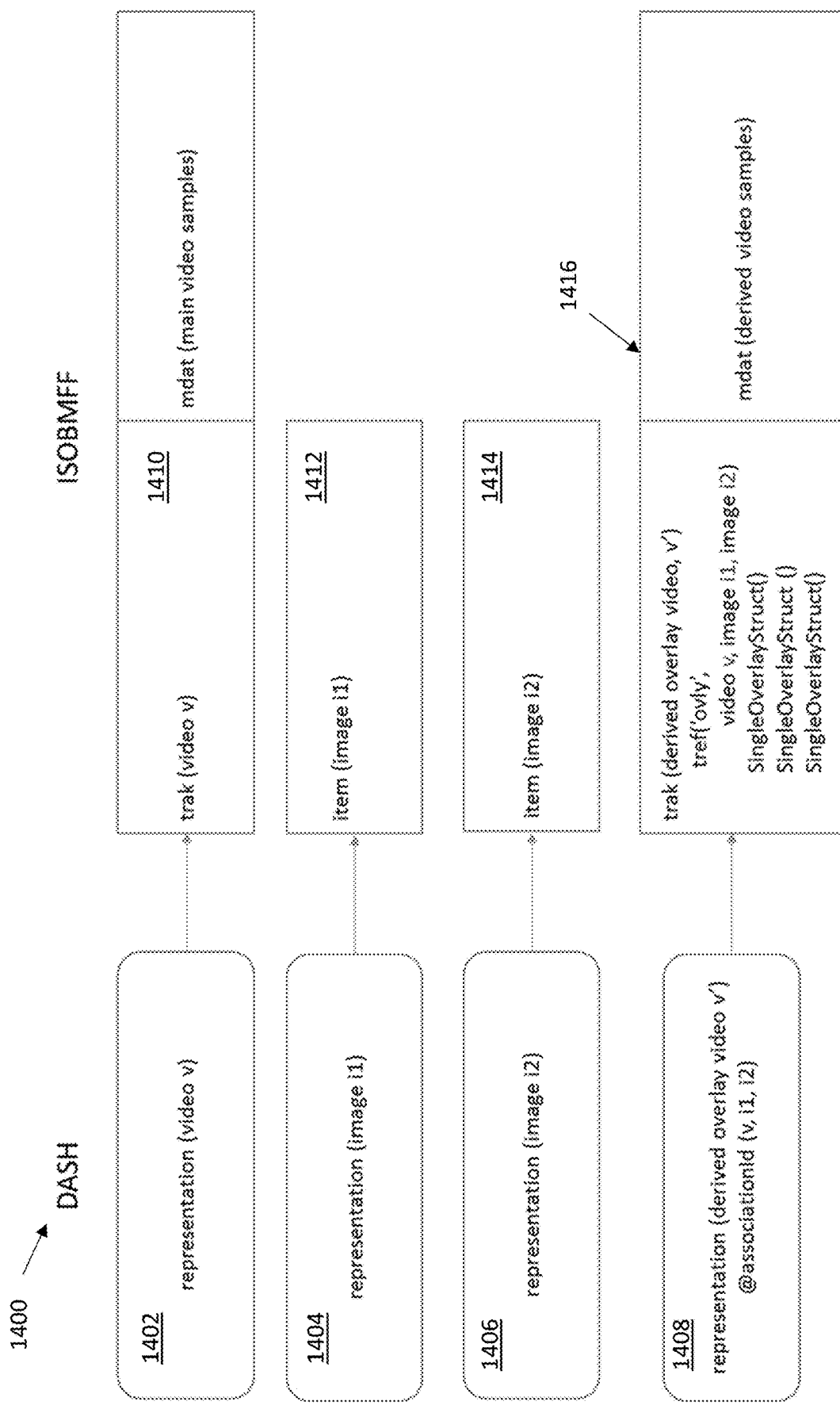
FIG. 14 shows an example of static overlays using derived overlay tracks, according to some embodiments.

FIG. 14 shows an example 1400 of static overlays using derived overlay tracks, according to some embodiments. As shown, DASH includes a representation for the video v 1402, a representation for the image i1 1404, and a representation for the image i2 1406, and a representation 1408 for the derived overlay video v'. The ISOBMFF includes a corresponding trak 1410 for the video v, an item 1412 for the image i1, and an item 1414 for the image i2, and a trak 1416 for the derived overlay video v'. Therefore, in some examples, if there is a derived track for the overlay, then a representation can be used for DASH. The derived overlay video representation v' 1408 can be created for the derived overlay video track v' 1416 to signal an overlay track derived from the video track v 1410 and image items 1412, 1414, with possibly additional association to the video and image representations.

Figure 15A:
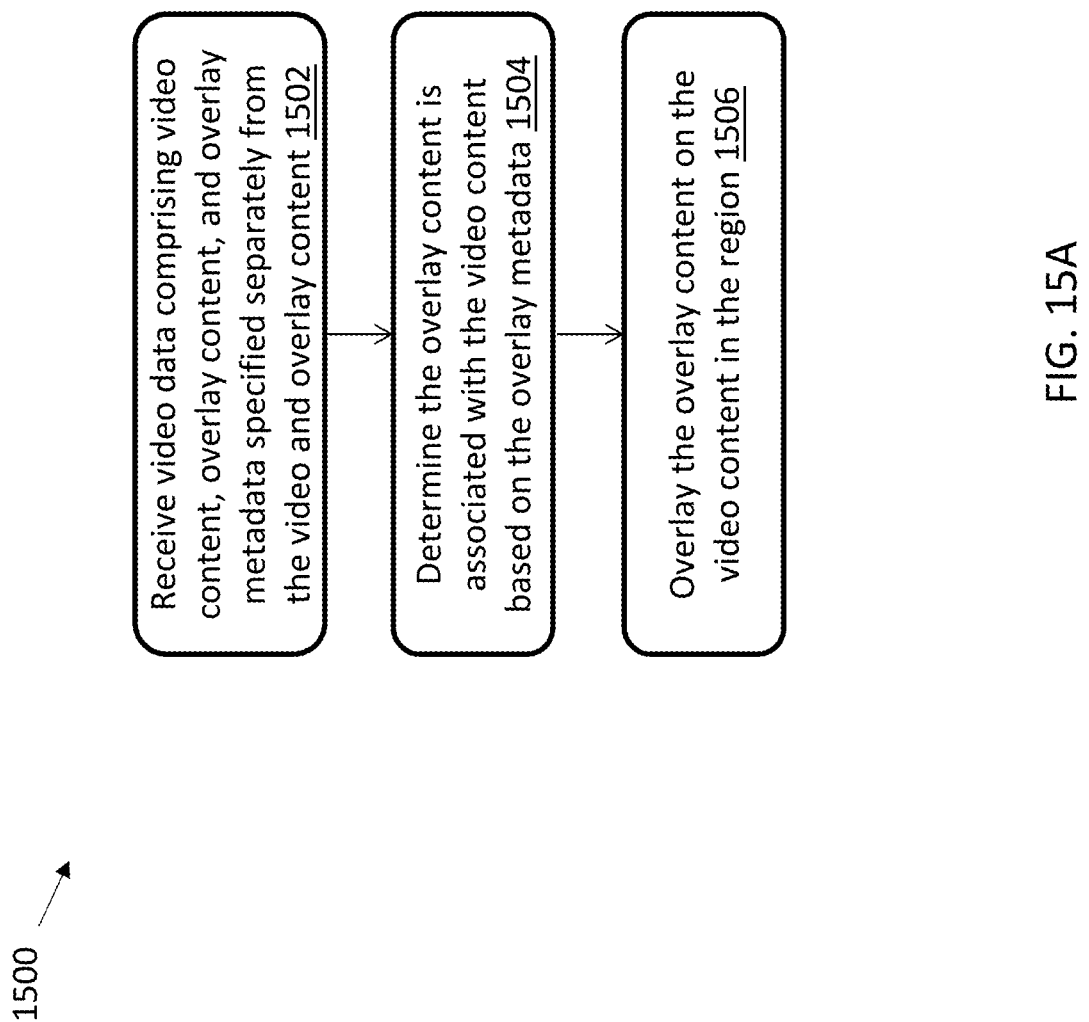
FIG. 15A shows a first exemplary decoding method for decoding video data, according to some embodiments.

FIG. 15A shows an exemplary decoding method 1500 for decoding video data, according to some embodiments. The decoding method 1500 can be executed by, for example, the decoding device 110 shown in FIG. 1 when decoding data, such as data generated following ISOBMFF. At step 1502, the decoding device receives video data that includes video content, overlay content, and overlay metadata that is specified separate from the video content and the overlay content. At step 1504, the decoding device determines that the overlay content is associated with the video content based on the overlay metadata. At step 1506, the decoding device overlays the overlay content on the video content in a region of the video content.

As described herein, in some embodiments the video data includes a timed metadata track that includes the overlay metadata. In some embodiments, as described herein, including in conjunction with FIG. 8A, the overlay content can be a time variant overlay that includes first overlay content (e.g., a first image i1) and second overlay content that is different than the first overlay content (e.g., a second image i2). The decoding device can determine, based on the overlay metadata, that first overlay content is associated with a first time period (e.g., the first twenty seconds of the video) and the second overlay content is associated with a second time period after the first time period (e.g., the next twenty seconds of the video). The decoding device can overlay the first overlay content on the video content in the region during the first time period, and overlay the second overlay content on the video content in the region during the second time period.

In some embodiments, as described herein, including in conjunction with FIG. 8B, the overlay content can be a dynamic overlay that includes first overlay content and second overlay content that is different than the first overlay content. In such embodiments, the overlay metadata does not specify whether to overlay the first overlay content or the second overlay content, such that whether to use the first overlay content or the second overlay content is determined dynamically.

In some embodiments, as described herein, including in conjunction with FIG. 8C, the overlay content can include static overlays such that the overlay content includes first overlay content and second overlay content that is different than the first overlay content. In such embodiments, the overlay metadata includes a first timed metadata track specifying the overlay metadata for the first overlay content, and a second timed metadata track specifying the overlay metadata for the second overlay content. The decoding device selects one of the first timed metadata track or the second timed metadata track to overlay either the first overlay content or the second overlay content, respectively.

In some embodiments, as described herein, including in conjunction with FIG. 8D, overlays can be implemented using track derivation. For example, the overlay metadata is specified in an overlay derived track, and overlaying the overlay content on the video content in the region can include generating sample content, according to the overlay metadata, for the derived track with the video content and the overlay content.

Figure 15B:
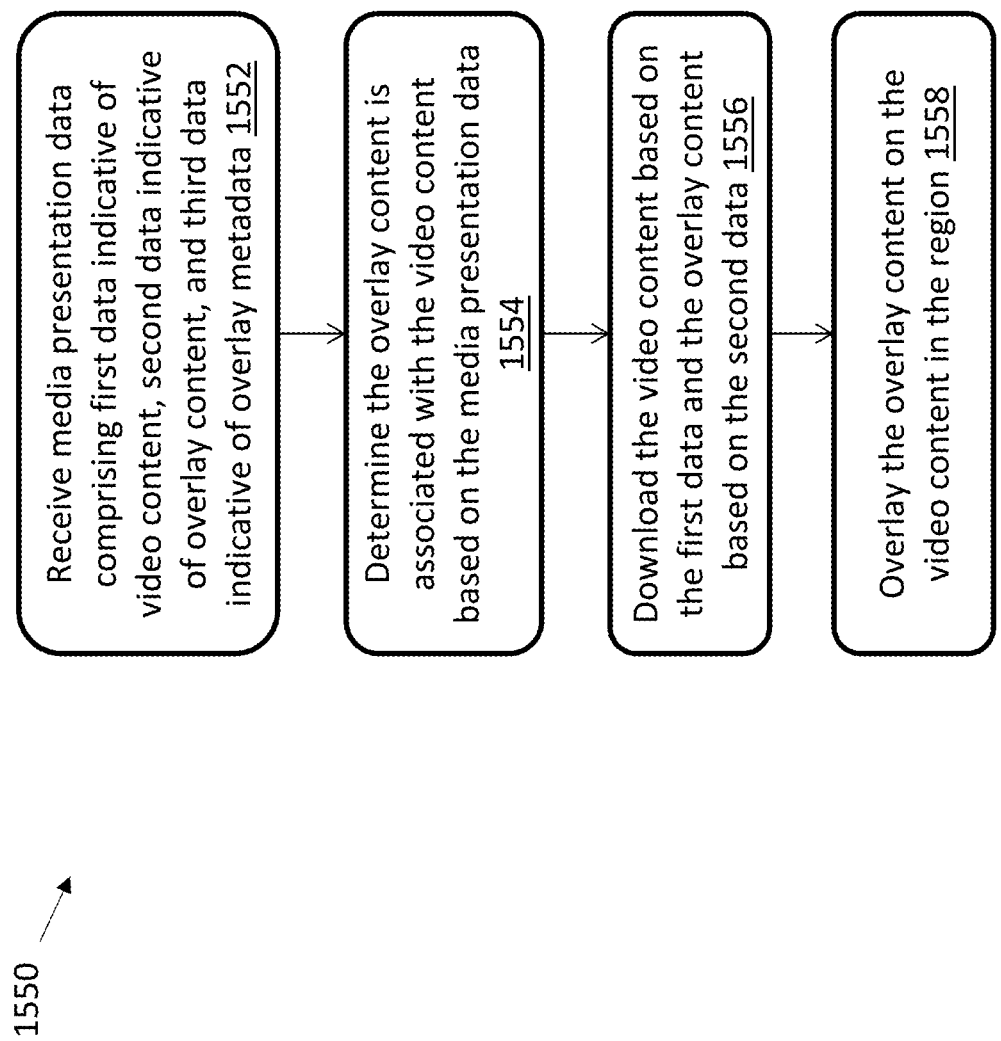
FIG. 15B shows a second exemplary decoding method for decoding video data, according to some embodiments.

FIG. 15B shows an exemplary decoding method 1550 for decoding video data, according to some embodiments. The decoding method 1550 can be executed by, for example, the decoding device 110 shown in FIG. 1 when decoding data, such as data generated following DASH and ISOBMFF. At step 1552, the decoding device receives media presentation data that includes first data (e.g., a first representation) indicative of video content (e.g., a video track), second data (e.g., a second representation) indicative of overlay content, and third data (e.g., an overlay descriptor within a representation) indicative of overlay metadata specifying how the overlay content should be overlaid onto the video content. At step 1554, the decoding device determines that the overlay content is associated with the video content based on the media presentation data. At step 1556, the decoding device downloads the video content based on the first data and downloads the overlay content based on the second data. At step 1558, the decoding device overlays the overlay content on the video content in a region of the video content based on the overlay metadata.

In some embodiments, as described herein, including in conjunction with FIG. 10, the overlay can be a static overlay where the second data comprises the third data (e.g., an overlay descriptor) that also includes the identifier of the overlay content.

In some embodiments, as described herein, including in conjunction with FIG. 11, the third data indicative of overlay metadata is time-based. The media presentation data can include fourth data indicative of second overlay content. The decoding device can determine, based on the time-based overlay metadata in the third data, that the overlay content is associated with a first time period and the second overlay content is associated with a second time period after the first time period. The decoding device can download the second overlay content based on the fourth data. The decoding device can overlay the first overlay content on the video content in the region during the first time period, and overlay the second overlay content on the video content in the region during the second time period.

In some embodiments, as described herein, including in conjunction with FIG. 12, the third data indicative of overly metadata is dynamic. The media presentation data can include fourth data indicative of second overlay content. In such embodiments, the fourth data does not specify whether to overlay the first overlay content or the second overlay content, such that whether to use the first overlay content or the second overlay content is determined dynamically.

In some embodiments, as described herein, including in conjunction with FIG. 13, the third data indicative of overlay metadata is first static overlay metadata for the overlay content. The media presentation data can include fourth data indicative of second overlay content, and fifth data indicative of second static overlay metadata for the second overlay content. The decoding device can select the first content to overlay on the video content.

As described herein, the techniques can be used in an encoder or a decoder. For example, an encoding device can be configured to encode video content and/or to create media presentation data in accordance with the techniques described herein.

MPEG has recently started its planning for development of MPEG-I phase 1b and phase 2 standards in support of Immersive Media, including those for 360 degree (or Omnidirectional) Audiovisual Media. While the standardization for the first version of the Omnidirectional Media Format (OMAF) (e.g., described in N17563, "Revised text of ISO/IEC FDIS 23090-2 Omnidirectional Media Format," San Diego, USA, April 2018, which is hereby incorporated by reference herein in its entirety) was finished early in 2018, the standard work for VR media types beyond Omnidirectional Media are still in the use case and requirement stage. What follows in this paragraph are exemplary types of VR (or immersive) media in terms of constraints on degrees of freedom (DoF), such as described in N17685, "Proposed Draft 1.0 of TR: Technical Report on Architectures for Immersive Media," San Diego, USA April 2018, which is hereby incorporated by reference in its entirety. As shown in the diagram 1600 in FIG. 16, 3DoF refers to three rotational and un-limited movements 1602, 1604 and 1606 around the X, Y and Z axes respectively (respectively pitch, yaw and roll). A typical use case for 3DoF is a user sitting in a chair looking at 3D 360 VR content on an HMD. 3DoF+ refers to 3DoF with an additional limited translational movements (typically, head movements) along the X, Y and Z axes. A typical use case is a user sitting in a chair looking at 3D 360 VR content on an HMD with the capability to slightly move his head up/down, left/right and forward/backward. 6DoF refers 3DoF with full translational movements along the X, Y and Z axes. A typical use case is a user freely walking through 3D 360 VR content (physically or via dedicated user input means) displayed on an HMD. Windowed 6DoF refers to 6DoF with constrained rotational movements around the X and Y axes (respectively, pitch and yaw) and constrained translational movements along the Z axis. A typical use case is a user watching a windowed VR content; the user cannot look outside the window frame and cannot walk through the window. Omnidirectional 6DoF refers to 6DoF with constrained translational movements along the X, Y and Z axes (typically, a couple of steps walking distance). A typical use case is a user freely walking through 3D 360 VR content (physically or via dedicated user input means) displayed on an HMD but within a constrained walking area.

The OMAF standard (ISO/IEC 23090, part 2) N17563 only supports 3DoF immersive media experiences, in which any translational movement of the user does not result in different omnidirectional media being rendered to the user. The latest OMAF standard activity is to address the 3DoF+ requirements in N17331, "MPEG-I Phase 1b Requirements, San Diego, USA April 2018, which is hereby incorporated by reference herein in its entirety.

The techniques described herein provide for a new type of VR content, namely, reversed 3DoF. The techniques are compliant with a number of requirements derived from the "looking around an object" related use cases in the MPEG-I Phase 2 Use Cases document (e.g., N17683, "MPEG-I Phase 2 Use Cases," San Diego, USA April 2018, which is hereby incorporated by reference herein in its entirety), that are to be added to the Draft Requirements for MPEG-I Phase 2 document (e.g., N17513, "Draft Requirements for MPEG-I Phase 2," San Diego, USA April 2018).

According to the techniques described herein, the user experiences in this "looking around a center" use case can be referred to as "reversed 3DoF" or "outside-in 3DoF" experiences, as they allow users or viewers to look around a center or an object from the outside in, rather than from the inside out in the traditional 3DoF experiences. The "looking around an object" or more generally "looking around a center" use cases represent restricted 6DoF user experiences that are different from the experiences already identified in MPEG-I, namely, 3DoF, 3DoF+, windowed 6DoF and omnidirectional 6DoF.

FIG. 17 shows a diagram 1700 of reversed 3DoF in which the user looks around an object 1708, which includes three rotational and un-limited movements 1702, 1704 and 1706 around the X, Y and Z axes respectively (respectively pitch, yaw and roll). A typical use case is a user moving around a center or an object 1708, as shown in FIG. 17, and looking from outside in at 3D reversed 360 VR content on an HMD. The transitional movements along the X, Y and Z axes may not have impacts on what the use sees; rather, what matters are the three rotational movements. This is in contrast to traditional 3DoF, as shown in the diagram 1600 of FIG. 16.

Figure 18B:
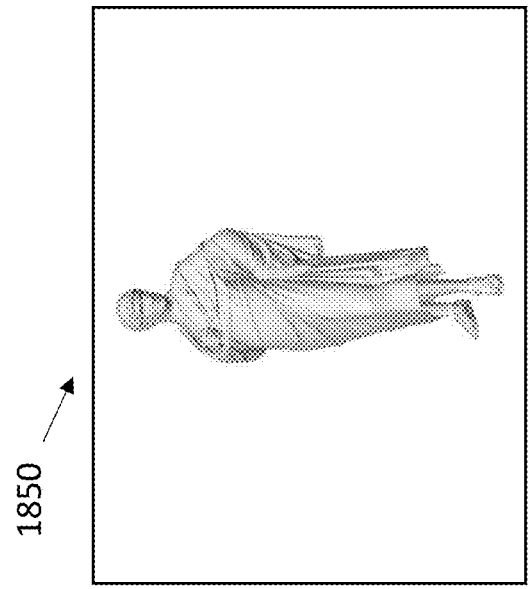
FIG. 18B is an image showing a second example of the reverse 3DoF use cases, with a still statue object in a room zoomed in compared to the image in FIG. 18B, according to some examples.
Figure 18A:
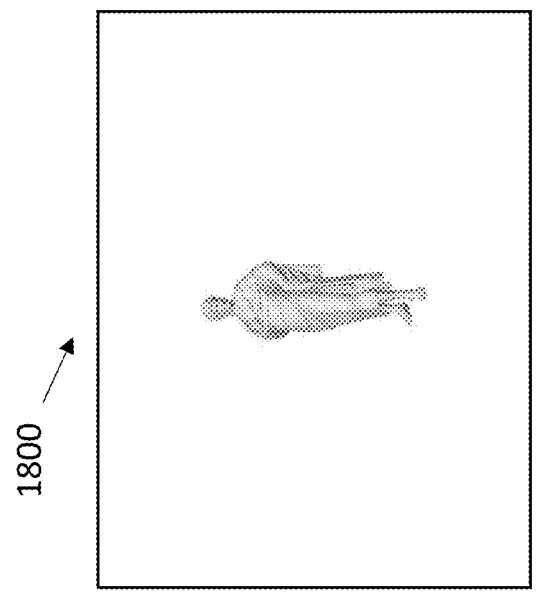
FIG. 18A is an image showing an example of the reverse 3DoF use cases, with a still statue object in a room, according to some examples.

Referring further to the "looking around an object" use cases in N17683, one exemplary use case is a subject looks around an object (e.g., use case 2.5 in N17683). FIG. 18A is an image 1800 showing an example of this use case, with a still statue object in a room, according to some examples. The description of this exemplary use case is "a single person moves around a still statue object in a room and looks at the statue." The features of this exemplary use case are "the media content is of sphere type, the object is inside the sphere, and the subject looks at the object from outside of the sphere, and has the 3 rotational DoFs plus 2 translational DoFs (no movement in the z-axis)." In some embodiments, this use case can also cover use cases like, for example, looking at a sport field within a stadium from surrounding seats, and/or looking at a performance on a stage within an opera house from any audience seat.

Another exemplary use case is a subject looks around an object with up-close views (e.g., use case 2.6 in N17683). FIG. 18B is an image 1850 showing an example of this use case, with a still statue object in a room zoomed in compared to the image 1800 in FIG. 18B, according to some examples. The description of this exemplary use case is "a single person moves around a still statue object in a room and looks at the statue, with the capability to look closely." The features of this exemplary use case are "[t]he media content consists of multiple nested spheres with the same center, and the object is at the center of the spheres, the subject looks at the object from outside of the spheres, and has the 3 rotational DoFs plus 2 translational DoFs (no movement in the z-axis). The subject is capable of view changing from sphere to sphere." In some embodiments, this use case can allow zooming for reversed 3DoF content, much like allowing zooming for 3DoF content documented in the MPEG-I Phase 1b Requirements N17563.

In some embodiments, the reversed 3DoF can include one or more requirements. For example, in some embodiments the specification can support identification of reversed 3DoF content so that it can be recognized and distinguished from other types of 6DoF content. As another example, the specification can support efficient content processing of reversed 3DoF content, including viewport dependent processing, that involves its projection, packing, sub-picture composition and/or media storage. As a further example, the specification can support signaling of regions of interest of reversed 3DoF content, including initial viewports, recommended viewports, region-wise quality ranking, and/or the like. As another example, the specification can support overlays, including transparency, of media content over reversed 3DoF content, where the media content include 3D/2D video, images, and timed text. As a further example, the specification can support profiling reversed 3DoF content specification to some common restricted use cases, such as (a) only yaw rotation (1DoF): looking horizontally around, (b) only yaw and pitch rotations (2DoF): looking horizontally and vertically around, and/or (c) only yaw and 180 degree pitch rotations: looking horizontally and vertically half way around (1.5DoF). As another example, the specification can support encapsulation and signaling of reversed 3DoF content in DASH and MMT, for efficient delivery adaptive to different network conditions and device capabilities and configurations. As a further example, the specification shall support zooming, where a viewport maintains a consistent quality of zooming content.

Regarding the Reversed 3DoF system architecture and content processing, one exemplary way to deal with reversed 3DoF content is to use multiple 2D cameras in a 3D configuration around the center or object to capture sufficient content to cover enough viewpoints (characterized by their corresponding yaw, pitch and roll rotation angles), and use these source content to synthesize content (or views) for other viewpoints, when the user/viewer moves around, in order to provide smooth transition experience. This can be referred to as the free-view TV approach. However, issues with this approach include how to organize the 2D content in a way that they can be efficiently delivered and rendered on users' CE devices.

Another exemplary way to implement the reversed 3DoF experiences is to use multiple pieces of 3DoF content captured in a 3D configuration around the center or object. to provide sufficient content to cover enough reversed 3DoF viewpoints, and use these 3DoF source content to synthesize content (or views) for other reversed 3DoF viewpoints that are not directly provided by these source content. While each piece of 3DoF content can be viewed on users' HMDs, this approach can inherit similar issues with the free-view TV approach. Moreover, this approach of using multiple pieces of 3DoF content to implement the "looking around an object" experience can have additional drawbacks. For example, in terms of processing complexity, dynamic content processing among different 3DoF pieces of content is complex and resource consuming when the user/viewer moves around, which can involve jumping among different configuration locations of the 3DoF content. Therefore, it can be hard to archive low motion-to-photon latency. As another example, regarding storage requirements, storing multiple pieces of 3DoF content requires more memory and a lot of content in these pieces, especially whose portions for looking away from the object, is not relevant to the "looking around an object" experience.

This techniques described herein consider reversed 3DoF content as a spherical content (or more generally a portion of spherical content), much like 3DoF content, but the viewing is outside-in, rather than inside-out for 3DoF content. In some embodiments, this kind of reversed 3DoF content can be generated by stitching either 2D camera captured content in the "free-view TV" approach or multiple pieces of 3DoF content in the multiple 3DoF approach, in manners of pre-processing or processing on the fly.

Figure 19:
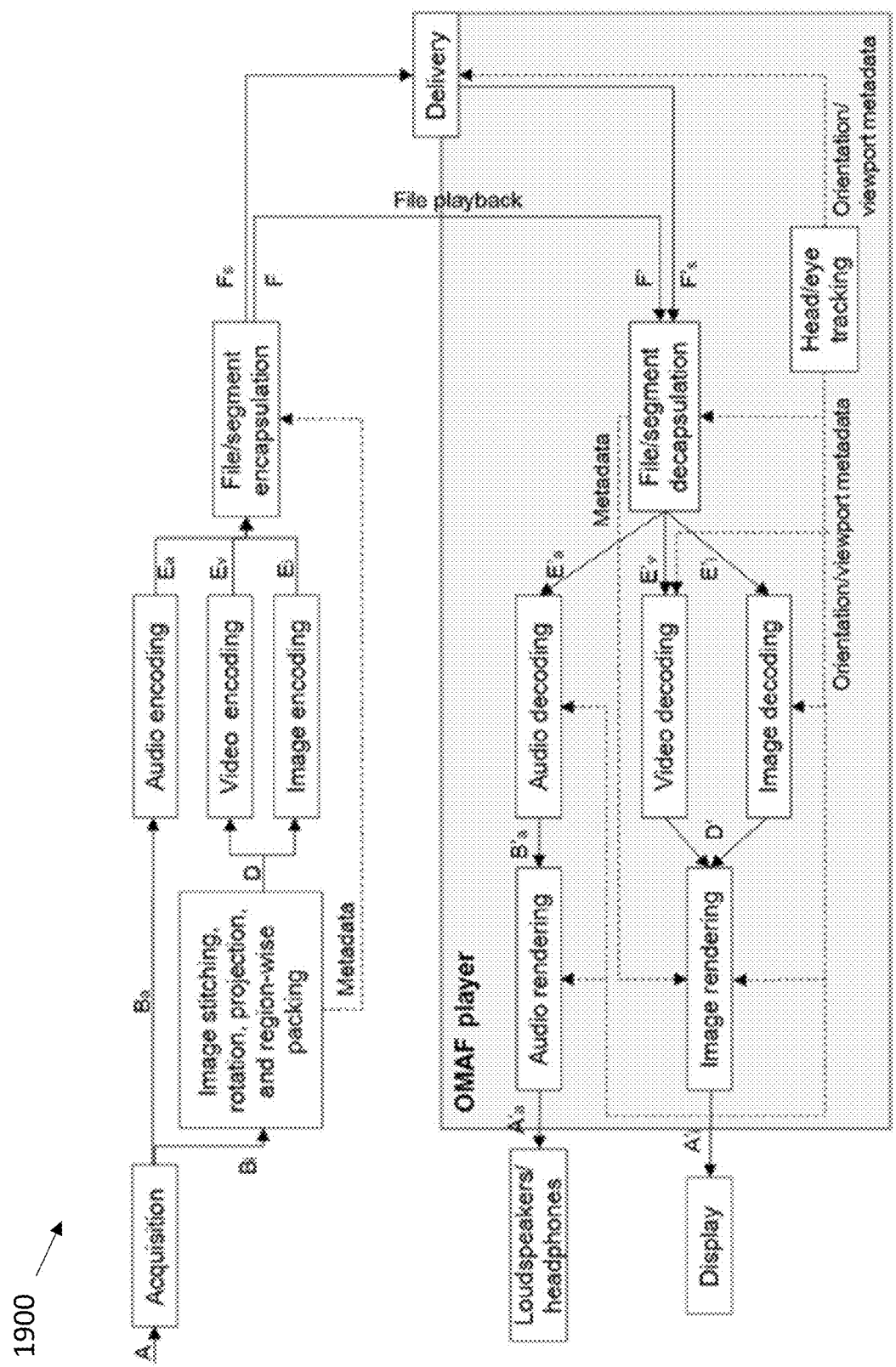
FIG. 19 shows the architecture and content flow for processing spherical 3DoF content, which can be used to process reversed 3DoF content, according to some embodiments.

An exemplary advantage of such reverse 3DoF content is the ability to leverage the existing 3DoF content processing flow and infrastructure for processing and delivering reversed 3DoF content, e.g., provided that reversed 3DoF content can be identified and signaled as a media type that is different from other 6DoF types (e.g., as described in N17685). Leveraging existing 3DoF content can be much more efficient than switching among multiple pieces of 3DoF content around a center or an object. More specifically, in some embodiments the spherical reversed 3DoF content for looking outside in can also be processed, e.g., projected, packed, divided (into sub-pictures for efficient delivery and rendering), encoded, delivered, decoded and rendered, using the same architecture and content flow for processing spherical 3DoF content as documented in OMAF N17563 and shown in FIG. 19.

Figure 20:
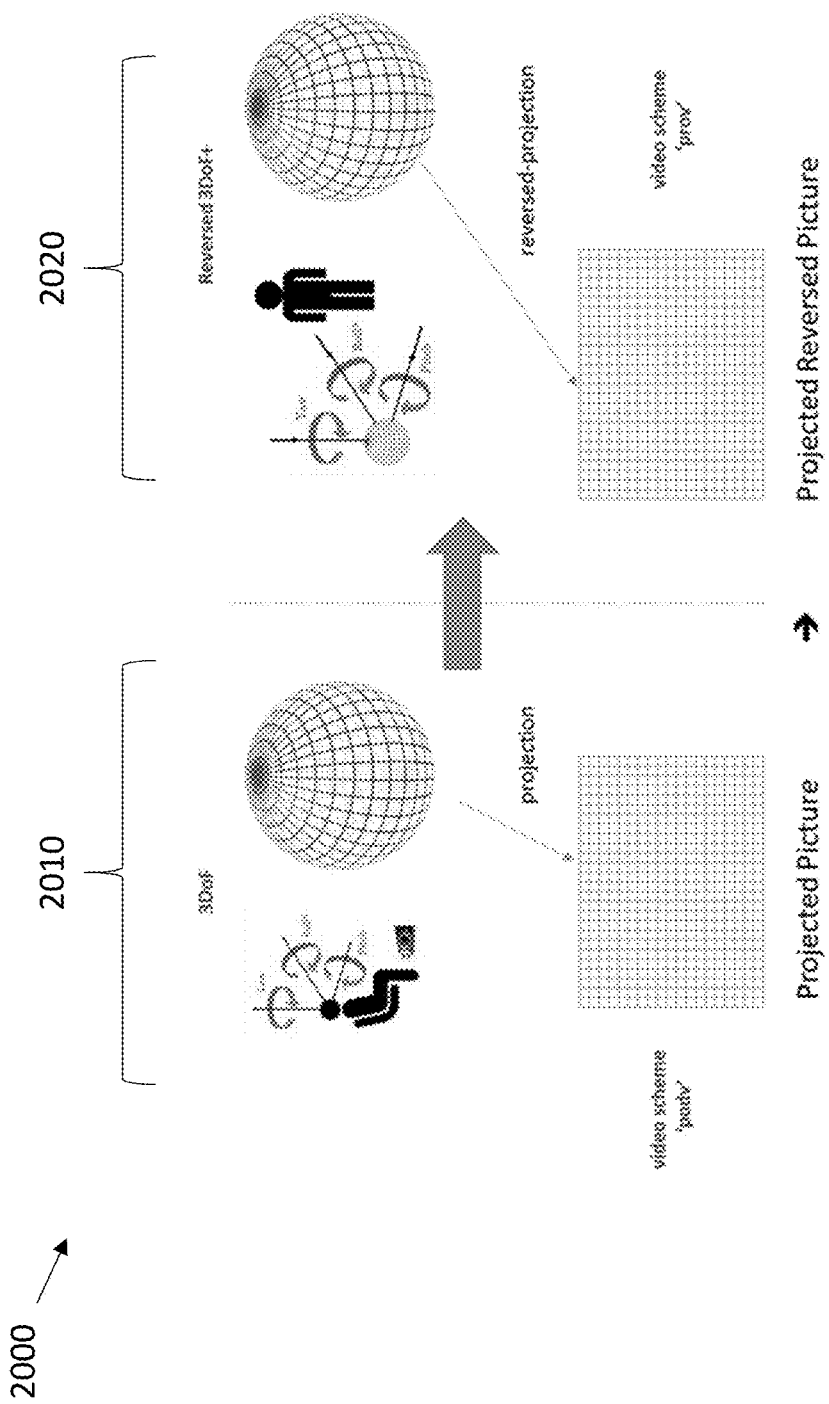
FIG. 20 is a diagram showing a projection for 3DoF and a reverse-projection for reversed 3DoF, according to some embodiments.

In some embodiments, reversed 3DoF content can be identified by identifying a projection format it uses, as a reversed projection format. For example, reversed 3DoF (spherical) content can be projected onto the 2D plane by using a projection format for 3DoF (spherical) content, such as ERP or CMP. The techniques can include ways to distinguish reversed 3DoF from 3DoF to indicate that a projection format used is for reversed 3DoF, not for 3DoF. For example, for each projection format xyz (e.g., ERP and CMP) for 3DoF, a projection format r-xyz (e.g., r-ERP and r-CMP) for reversed 3DoF can be devised to indicate that it is the projection format used but for reversed 3DoF content. FIG. 20 is a diagram 2000 showing a projection for 3DoF and a reverse-projection for reversed 3DoF, according to some embodiments. As shown in the left portion 2010, when the content is considered as the outside of the sphere, then the traditional 3DoF projects the sphere onto the 2D, and compresses the content as described herein (e.g., in conjunction with FIG. 2) to deliver the content to the client. As shown in the right portion 2020, when using a reversed 3DoF, then essentially the same processing flow used for traditional processing can be used to display the content outside-in. For example, when a user moves their head as discussed in conjunction with FIG. 17, if the user looks around the object in reversed 3DoF, it is like the user turning their head in the traditional 360 degree 3DoF, and therefore the content can be processed accordingly.

In some embodiments, a way to identify reversed 3DoF content when it is stored in the ISOBMFF format, is to devise a video scheme 'prov' (projected reversed omnidirectional video) for projected reversed omnidirectional (3DoF) video content as shown in FIG. 20. The scheme, such as 'prov,' can be used to indicate that decoded pictures are packed pictures containing reversed 3DoF content. The use of the projected reversed omnidirectional video scheme can be indicated by scheme_type equal to 'prov' within SchemeTypeBox in the RestrictedSchemeInfoBox. Similar to OMAF, this restricted video scheme type can be used in conjunction with other OMAF related boxes, such as ProjectedOmniVideoBox contained within the SchemeInformationBox to indicate a format of projected reversed 3DoF content.

Therefore, in some embodiments the traditional processing used for 3DoF can be used to implement reverse 3DoF. According to some embodiments, once reversed 3DoF content can be identified and signaled, the requirements for reversed 3DoF content can be met by using the signaling, storage and encapsulation mechanisms in the existing OMAF specification N17563 and the new signaling features such as for overlay (e.g., specified in m42908, "Signalling of Overlays for Omnidirectional Video and Images using Timed Metadata Tracks in ISOBMFF," July 2018, Ljubljana, Slovenia, which is hereby incorporated by reference in its entirety), zooming (e.g., specified in m42909, "Signalling of Multiple Viewpoints in OMAF for Support of Zooming," July 2018, Ljubljana, Slovenia, which is hereby incorporated by reference in its entirety), and track derivation (e.g., m43424, "Overlay Track Derivation," July 2018, Ljubljana, Slovenia, which is hereby incorporated by reference in its entirety).

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A decoding method for decoding video data, the method comprising:
    receiving video data comprising:
        video content;
        overlay content comprising first overlay content and second overlay content that is different than the first overlay content; and
        overlay metadata that is specified separate from the video content and overlay content, wherein:
            the overlay metadata specifies a region of the video content; and
            the overlay metadata comprises:
                a first timed metadata track specifying first overlay metadata for the first overlay content; and
                a second timed metadata track specifying second overlay metadata for the second overlay content;
    determining the overlay content is associated with the video content based on the overlay metadata;
    selecting one of the first timed metadata track or the second timed metadata track to overlay either the first overlay content or the second overlay content, respectively; and
    overlaying the selected first overlay content or second overlay content onto the video content in the region of the video content.

2. The decoding method of claim 1, comprising:
    determining, based on the overlay metadata, the first overlay content is associated with a first time period and the second overlay content is associated with a second time period after the first time period;
    overlaying the first overlay content on the video content in the region during the first time period; and
    overlaying the second overlay content on the video content in the region during the second time period.

3. The decoding method of claim 1, wherein:
    the overlay metadata does not specify whether to overlay the first overlay content or the second overlay content, such that whether to use the first overlay content or the second overlay content is determined dynamically.

4. A decoding method for decoding streaming data, the method comprising:
    receiving media presentation data, the media presentation data comprising:
        first data indicative of video content;
        second data indicative of first overlay content;
        third data indicative of first static overlay metadata specifying how the first overlay content should be overlaid onto the video content;
        fourth data indicative of second overlay content; and
        fifth data indicative of second static overlay metadata for the second overlay content;
    determining the first overlay content is associated with the video content based on the media presentation data;
    selecting the first overlay content to overlay on the video content;
    downloading (a) the video content based on the first data and (b) the first overlay content based on the second data; and
    overlaying the first overlay content on the video content in a region of the video content based on the first static overlay metadata.

5. The method of claim 4, wherein:
    the second data comprises the third data comprising an identifier of the first overlay content.

6. An apparatus configured to decode video data, the apparatus comprising a processor in communication with memory, the processor being configured to execute instructions stored in the memory that cause the processor to:
    receive video data comprising:
        video content;
        overlay content comprising first overlay content and second overlay content that is different than the first overlay content; and
        overlay metadata that is specified separate from the video content and overlay content, wherein:
            the overlay metadata specifies a region of the video content; and
            the overlay metadata comprises:
                a first timed metadata track specifying first overlay metadata for the first overlay content; and
                a second timed metadata track specifying second overlay metadata for the second overlay content;
    determine the overlay content is associated with the video content based on the overlay metadata;
    select one of the first timed metadata track or the second timed metadata track to overlay either the first overlay content or the second overlay content, respectively; and overlay the selected first overlay content or second overlay content onto the video content in the region of the video content.

7. The apparatus of claim 6, wherein the instructions further cause the processor to:
determine, based on the overlay metadata, the first overlay content is associated with a first time period and the second overlay content is associated with a second time period after the first time period;
overlay the first overlay content on the video content in the region during the first time period; and
overlay the second overlay content on the video content in the region during the second time period.

8. The apparatus of claim 6, wherein:
the overlay metadata does not specify whether to overlay the first overlay content or the second overlay content, such that whether to use the first overlay content or the second overlay content is determined dynamically.

9. An apparatus configured to decode video data, the apparatus comprising a processor in communication with memory, the processor being configured to execute instructions stored in the memory that cause the processor to:
receive media presentation data, the media presentation data comprising:
first data indicative of video content;
second data indicative of first overlay content;
third data indicative of first static overlay metadata specifying how the first overlay content should be overlaid onto the video content;
fourth data indicative of second overlay content; and
fifth data indicative of second static overlay metadata for the second overlay content;
determine the first overlay content is associated with the video content based on the media presentation data;
selecting the first overlay content to overlay on the video content;
download (a) the video content based on the first data and (b) the first overlay content based on the second data; and
overlay the first overlay content on the video content in a region of the video content based on the first static overlay metadata.

10. The apparatus of claim 9, wherein:
the second data comprises the third data comprising an identifier of the first overlay content.

11. A decoding method for decoding video data, the method comprising:
receiving video data comprising:
video content;
overlay content; and
overlay metadata that is specified separate from the video content and overlay content in an overlay derived track, wherein the overlay metadata specifies a region of the video content;
determining the overlay content is associated with the video content based on the overlay metadata; and
overlaying the overlay content onto the video content in the region of the video content, comprising generating sample content, according to the overlay metadata, for the derived track with the video content and the overlay content.

12. A decoding method for decoding streaming data, the method comprising:
receiving media presentation data, the media presentation data comprising:
first data indicative of video content;
second data indicative of first overlay content;
third data indicative of overlay metadata specifying how the first overlay content should be overlaid onto the video content, wherein the third data indicative of overlay metadata is dynamic; and
fourth data indicative of second overlay content;
determining the first overlay content is associated with the video content based on the media presentation data;
downloading (a) the video content based on the first data and (b) the first overlay content based on the second data; and
overlaying the first overlay content on the video content in a region of the video content based on the overlay metadata,
wherein the third data does not specify whether to overlay the first overlay content or the second overlay content, such that whether to use the first overlay content or the second overlay content is determined dynamically.

* * * * *